(12) United States Patent
Kanai et al.

(10) Patent No.: US 12,473,728 B2
(45) Date of Patent: Nov. 18, 2025

(54) INFORMATION PROCESSING DEVICE, INFORMATION PROCESSING METHOD, AND NON-TRANSITORY COMPUTER READABLE RECORDING MEDIUM STORING INFORMATION PROCESSING PROGRAM

(71) Applicant: PANASONIC HOLDINGS CORPORATION, Osaka (JP)

(72) Inventors: Hirofumi Kanai, Osaka (JP); Yuka Yamada, Nara (JP); Hideyuki Maehara, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 189 days.

(21) Appl. No.: 18/224,743

(22) Filed: Jul. 21, 2023

(65) Prior Publication Data

US 2023/0358027 A1 Nov. 9, 2023

Related U.S. Application Data

(63) Continuation of application No. PCT/JP2021/038435, filed on Oct. 18, 2021.
(Continued)

(30) Foreign Application Priority Data

Oct. 6, 2021 (JP) ................ 2021-164549

(51) Int. Cl.
*E03D 9/08* (2006.01)
*E03C 1/05* (2006.01)
(Continued)

(52) U.S. Cl.
CPC ................ *E03D 9/08* (2013.01); *E03C 1/057* (2013.01); *G06T 7/70* (2017.01); *G06V 40/103* (2022.01)

(58) Field of Classification Search
CPC ........................................ E03D 9/08
See application file for complete search history.

(56) References Cited

U.S. PATENT DOCUMENTS

| | | | |
|---|---|---|---|
| 5,201,080 A | 4/1993 | Tanaka et al. | |
| 2018/0020984 A1* | 1/2018 | Hall ...................... | A61B 5/318 600/301 |

(Continued)

FOREIGN PATENT DOCUMENTS

| CN | 104727411 | 6/2015 |
|---|---|---|
| CN | 106889935 | 6/2017 |

(Continued)

OTHER PUBLICATIONS

Dec. 7, 2021 International Search Report (ISR) issued in International Patent Application No. PCT/JP2021/038435, along with an English translation thereof.

*Primary Examiner* — Christine J Skubinna
(74) *Attorney, Agent, or Firm* — GREENBLUM & BERNSTEIN, P.L.C.

(57) ABSTRACT

A notification device includes: an image data acquisition part that acquires image data captured by a camera which is provided to photograph buttocks of a user sitting on a toilet seat; a sitting position detection part that detects a sitting position of the user sitting on the toilet seat provided on a toilet by image recognition of the image data; and a guidance information output part that outputs, on the basis of the detected sitting position, guidance information to guide the user to an appropriate sitting position.

9 Claims, 14 Drawing Sheets

Related U.S. Application Data

(60) Provisional application No. 63/141,700, filed on Jan. 26, 2021.

(51) Int. Cl.
*G06T 7/70* (2017.01)
*G06V 40/10* (2022.01)

(56) References Cited

U.S. PATENT DOCUMENTS

| | | | |
|---|---|---|---|
| 2019/0290079 A1* | 9/2019 | Takaki | A61B 5/4872 |
| 2019/0368179 A1* | 12/2019 | Tiagai | E03D 9/08 |
| 2021/0345843 A1* | 11/2021 | Sakai | A47K 13/24 |
| 2022/0213675 A1* | 7/2022 | Kramer | H04N 23/56 |
| 2022/0237906 A1* | 7/2022 | Ueda | G06V 10/7747 |
| 2023/0225714 A1* | 7/2023 | Sato | G16H 30/40 |
| | | | 73/865.8 |

FOREIGN PATENT DOCUMENTS

| | | |
|---|---|---|
| CN | 108287031 | 7/2018 |
| CN | 211200606 | 8/2020 |
| JP | 3044764 | 5/2000 |
| JP | 2001-317109 | 11/2001 |
| JP | 2019-168443 | 10/2019 |
| JP | 2020-187089 | 11/2020 |

* cited by examiner

INFORMATION PROCESSING DEVICE, INFORMATION PROCESSING METHOD, AND NON-TRANSITORY COMPUTER READABLE RECORDING MEDIUM STORING INFORMATION PROCESSING PROGRAM

FIELD OF INVENTION

The present disclosure relates to a technology of guiding a user sitting on a toilet seat to an appropriate sitting position.

BACKGROUND ART

For instance, Patent Literature 1 discloses a sanitary cleansing device that detects a sitting position of a user by using a plurality of infrared light emitting and receiving devices, and automatically adjusts cleansing water so as to hit only a range of the sitting position.

However, the conventional technology has a possibility that a toilet, a periphery therearound, and a garment of the user may be stained because of the lack of consideration of guiding the user sitting on a toilet seat to an appropriate sitting position, and thus needs further improvement.

Patent Literature 1 is Japanese Unexamined Patent Publication No. 2001-317109.

SUMMARY OF THE INVENTION

The present disclosure has been achieved to solve the drawbacks described above, and has an object of providing a technology for preventing a toilet, a periphery therearound, and a garment of a user from being stained.

An information processing device according to the present disclosure includes: a sitting position detection part that detects a sitting position of a user sitting on a toilet seat provided on a toilet; and a guidance information output part that outputs, on the basis of the detected sitting position, guidance information to guide the user to an appropriate sitting position.

This disclosure achieves prevention of a toilet, a periphery therearound, and a garment of a user from being stained.

DETAILED DESCRIPTION

Figure 1:
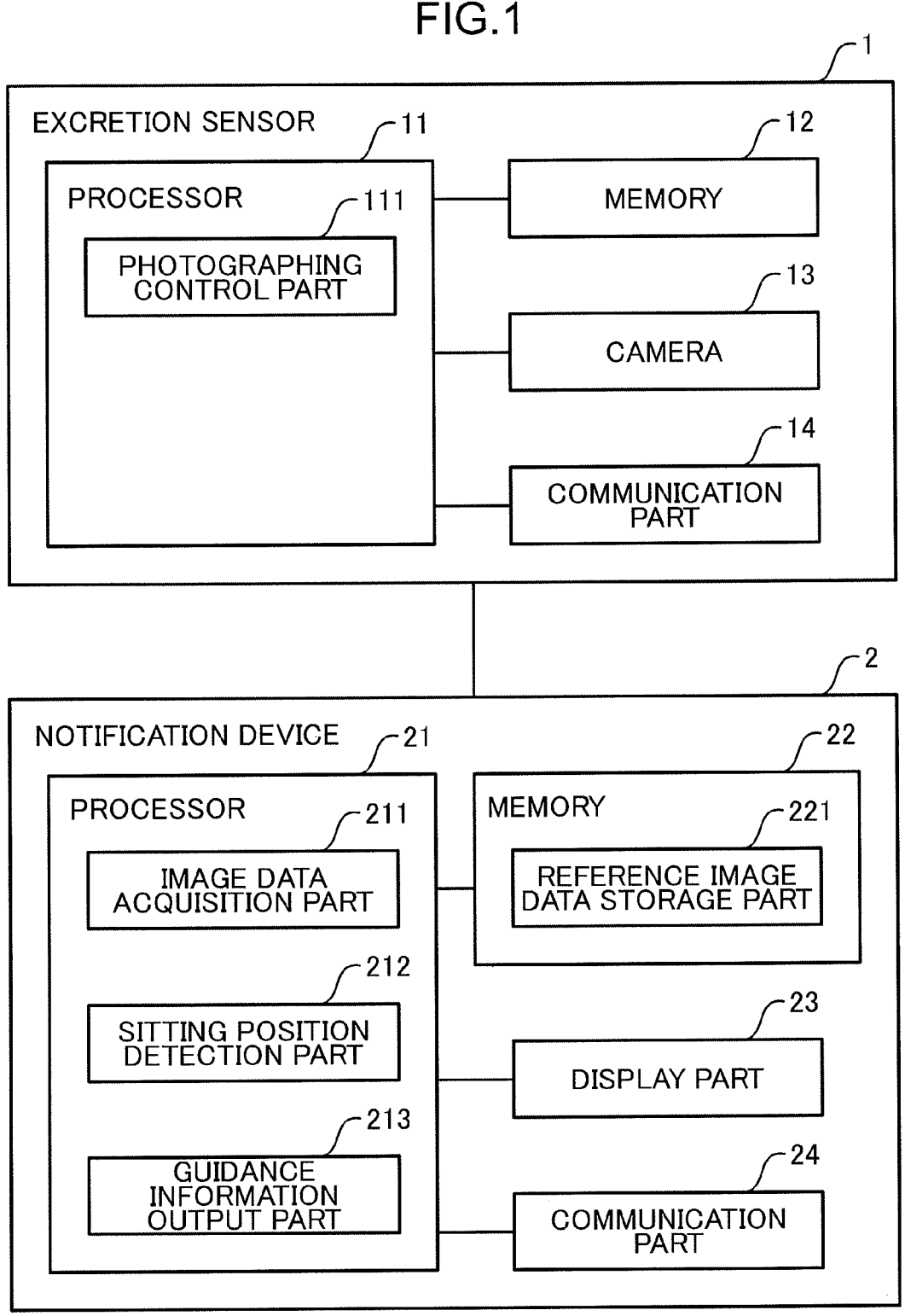
FIG. 1 is a diagram showing a configuration of a guidance system in a first embodiment of the present disclosure.

Knowledge Forming the Basis of the Present Disclosure

In a care facility, a control of an excretion rhythm of a care receiver is important for the care receiver to keep healthy. For instance, the excretion rhythm is controlled by intake of a laxative.

However, an elderly care receiver may face a difficulty in defecation even by taking such a laxative due to a decrease in a physical ability, like a weakened core muscle force, along with his/her aging. In such a case, a cleansing function provided to a bidet-toilet seat is used to stimulate buttocks (anus) of the care receiver and thereby encourage the defecation.

However, when the care receiver is assisted by a care giver or carer to sit on a toilet seat, the care receiver may find it difficult to sit in a position where the cleansing water reliably hits the anus. When the cleansing water hits a portion other than the anus, resultant reflected water may disperse, and stain a toilet, a periphery therearound, and a garment of the care receiver. When excretion starts while the cleansing water stimulates the buttocks, the cleansing water may hit excrement, and resultant reflected water containing the excrement may disperse therearound, and stain the toilet, the periphery therearound, and the garment of the care receiver.

The conventional technology fails to consider guiding the user sitting on the toilet seat to an appropriate sitting position. The conventional technology further fails to consider an excretion start during splaying-out of the cleansing water to the buttocks. This may cause the resultant reflected water to stain the toilet, the periphery therearound, and the garment of the user, or may increase a burden on a care giver to clean the toilet, the periphery therearound, and a garment of a care receiver who serves as the user.

To solve the above-described drawbacks, an information processing device according to one aspect of the present disclosure includes: a sitting position detection part that detects a sitting position of a user sitting on a toilet seat provided on a toilet; and a guidance information output part that outputs, on the basis of the detected sitting position, guidance information to guide the user to an appropriate sitting position.

According to this configuration, the user having been guided to an appropriate sitting position can excrete in the appropriate sitting position. The configuration thus achieves prevention of the toilet, a periphery therearound, and a garment of the user from being stained.

Further, the toilet, the periphery therearound, and the garment of the user can be kept clean. This additionally attains reduction in a burden on a care giver to clean the toilet, the periphery therearound, and a garment of a care receiver who serves as the user.

In this description, the meanings of excretion include defecation and urination, and the meanings of excrement include feces and urine.

The information processing device may further include an image data acquisition part that acquires image data captured by a camera which is provided to photograph buttocks of the user sitting on the toilet seat. The sitting position detection part may detect the sitting position by image recognition of the image data.

This configuration enables detection of the sitting position of the user onto the toilet seat in accordance with the position of the buttocks of the user in the image data.

In the information processing device, the sitting position detection part may detect whether a pixel being at a lowest position among pixels constituting an image of the buttocks in the image data falls within a first region including a water pool part of the toilet, a second region in front of the water pool part, or a third region in the rear of the water pool part. The guidance information output part may output first guidance information indicating that the sitting position of the user is appropriate when the pixel being at the lowest position among the pixels constituting the image of the buttocks in the image data falls within the first region, output second guidance information indicating that the sitting position of the user is in a front portion of the toilet seat when the pixel being at the lowest position among the pixels constituting the image of the buttocks in the image data falls within the second region, or output third guidance information indicating that the sitting position of the user is in a rear portion of the toilet seat when the pixel being at the lowest position among the pixels constituting the image of the buttocks in the image data falls within the third region.

For instance, when a lower portion of the buttocks of the sitting user is located above the water pool part of the toilet, the sitting position of the user is considered as being appropriate. When the lower portion of the buttocks of the sitting user is in front of the water pool part of the toilet, the sitting position of the user is considered as being in the front portion of the toilet seat. When the lower portion of the buttocks of the sitting user is in the rear of the water pool part of the toilet, the sitting position of the user is considered as being in the rear portion of the toilet seat. In this manner, the sitting position of the user is detectable on the basis of a positional relationship between the pixel being at the lowest position among the pixels constituting the image of the buttocks in the image data and the water pool part of the toilet.

The information processing device may further include: an excretion determination part that determines whether the user has started excretion; and a signal generation part that generates a control signal to reduce a pressure of cleansing water being sprayed out of a cleansing nozzle to cleanse the buttocks of the user, or to suspend the cleansing water from being sprayed out of the cleansing nozzle when it is determined that the user has started excretion.

This configuration reduces a pressure of the cleansing water being sprayed out of the cleansing nozzle or suspends the cleansing water from being sprayed out of the cleansing nozzle, when it is determined that the user has started excretion while the cleansing water is sprayed out of the cleansing nozzle to the buttocks of the user. This consequently can avoid dispersion of reflected water deriving from cleansing water having hit the excrement therearound, and thus can prevent the toilet, the periphery therearound, and the garment of the user from being stained.

The information processing device may further include an image data acquisition part that acquires image data captured by a camera which is provided to photograph an inner part of the toilet. The excretion determination part may calculate a difference image between reference image data indicating a state of the inner part of the toilet without excrement and the acquired image data, determine whether the image data includes an image of the excrement on the basis of luminances of color components of the difference image, and determine that the user has started the excretion when it is determined that the image data includes the image of the excrement.

In this configuration, image data captured by the camera which is provided to photograph the inner part of the toilet is acquired. A difference image between the reference image data indicating a state of the inner part of the toilet without excrement and the acquired image data is calculated. The image data is determined whether to include an image of the excrement on the basis of luminances of color components of the difference image. When the image data is determined to include the image of the excrement, it is determined that the user has started the excretion. This configuration consequently facilitates, by using image data, determination as to whether the user has started the excretion.

The information processing device may further include: a sinking determination part that determines whether buttocks of the user sink into the toilet; and a warning information output part that outputs warning information about a warning of the sinking of the buttocks of the user into the toilet when the buttocks are determined to sink into the toilet.

In this configuration, when the buttocks of the user are determined to sink into the toilet, warning information about a warning of the sinking of the buttocks of the user into the toilet is output. In response, a care giver of the user having confirmed the warning information can assist the user, or attach an auxiliary toilet seat having an opening narrower than an opening of the toilet seat to the toilet seat. This succeeds in relieving a pain of the user in the excretion, and preventing the toilet, the periphery therearound, and the garment of the user from being stained.

The information processing device may further include an image data acquisition part that acquires image data captured by a camera which is provided to photograph the buttocks of the user sitting on the toilet seat. The sinking determination part may determine the sinking of the buttocks into the toilet when a distance from an upper end of the image data to a pixel being at a lowest position among pixels constituting an image of the buttocks in the image data is a predetermined distance or longer.

This configuration facilitates determination as to whether the buttocks of the user sink into the toilet in accordance with the position of the buttocks of the user in the image data.

In the information processing device, the warning information may include information for encouraging use of an auxiliary toilet seat attachable onto the toilet seat and having an opening narrower than an opening of the toilet seat.

According to this configuration, the warning information includes information for encouraging use of the auxiliary toilet seat attachable onto the toilet seat and having the opening narrower than the opening of the toilet seat. The use of the auxiliary toilet seat leads to a success in relieving of the pain of the user in the excretion, and prevention of the toilet, the periphery therearound, and the garment of the user from being stained.

The information processing device may further include: a cleansed position determination part that determines, on the basis of the detected sitting position, a cleansed position of the buttocks of the user; a nozzle position determination part that determines, on the basis of the determined cleansed position, a position of the cleansing nozzle to cleanse the buttocks of the user; and a signal generation part that generates a control signal to control the cleansing nozzle to come to the determined position of the cleaning nozzle.

In this configuration, a position of the cleansing nozzle is determined on the basis of the sitting position of the user to cleanse the buttocks of the user, and thus, the configuration can keep the cleansing water to be sprayed out of the cleansing nozzle from hitting a portion other than the buttocks, and prevent the toilet, the periphery therearound, and the garment of the user from being stained.

Moreover, the disclosure can be realized as: an information processing device including the above-described distinctive configurations; and an information processing method executing distinctive ways corresponding to the distinctive features included in the information processing device. Additionally, the disclosure can be realized by a computer program causing a computer to execute the distinctive ways included in the information processing method. From these perspectives, the same advantageous effects as those of the information processing device are achievable in the following other aspects.

An information processing method according to another aspect of the disclosure includes: by a computer, detecting a sitting position of a user sitting on a toilet seat provided on a toilet; and outputting, on the basis of the detected sitting position, guidance information to guide the user to an appropriate sitting position.

A non-transitory computer readable recording medium storing an information processing program according to still another aspect of the disclosure includes causing a computer to function as: a sitting position detection part that detects a sitting position of a user sitting on a toilet seat provided on a toilet; and a guidance information output part that outputs, on the basis of the detected sitting position, guidance information to guide the user to an appropriate sitting position.

Hereinafter, embodiments of the disclosure will be described with reference to the accompanying drawings. It should be noted that each of the following embodiments illustrates one example of the disclosure, and does not delimit the technical scope of the disclosure.

First Embodiment

Figure 2:
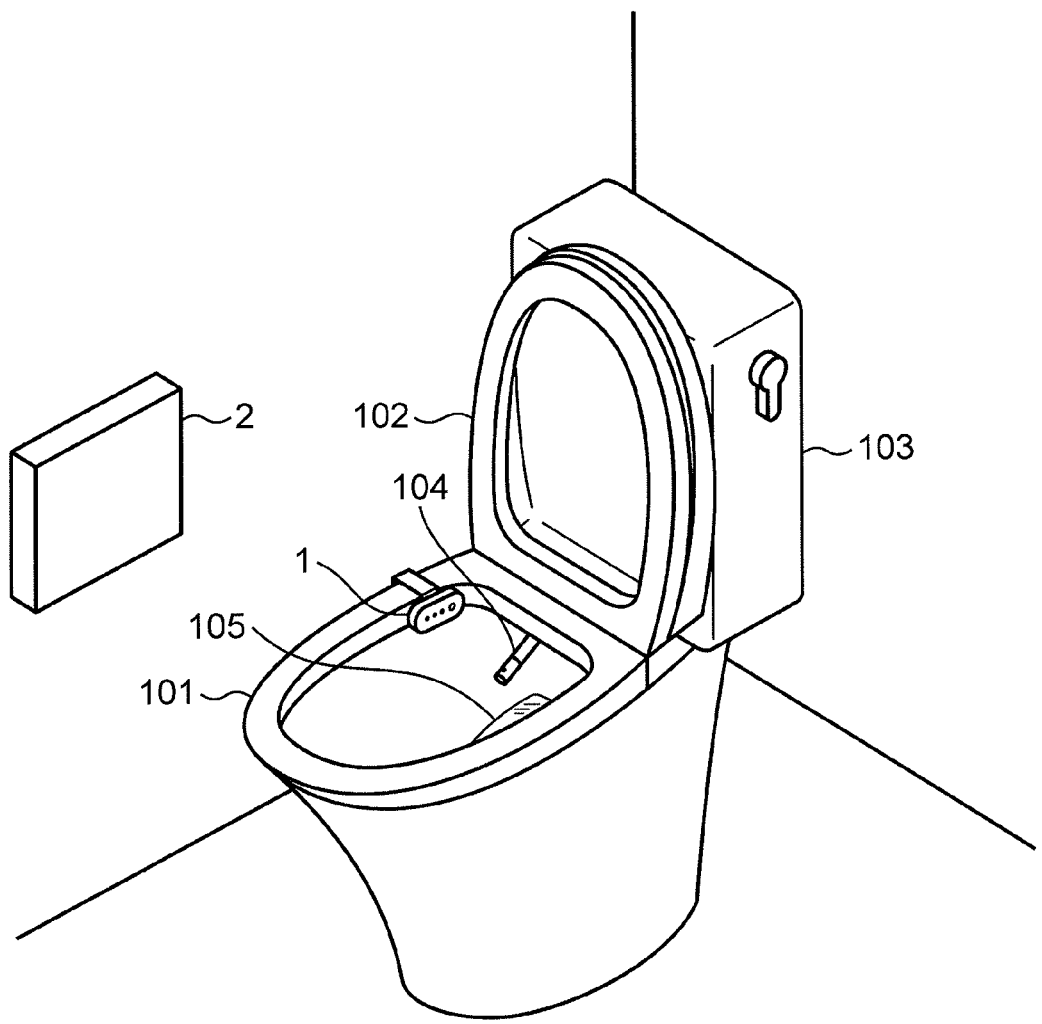
FIG. 2 is a view explaining arrangement positions of an excretion sensor and a notification device in the first embodiment of the disclosure.

FIG. 1 is a diagram showing a configuration of a guidance system in a first embodiment of the present disclosure. FIG. 2 is a view explaining arrangement positions of an excretion sensor 1 and a notification device 2 in the first embodiment of the disclosure.

The guidance system shown in FIG. 1 includes the excretion sensor 1 and the notification device 2.

The excretion sensor 1 is provided in a toilet 101. As shown in FIG. 2, the excretion sensor 1 is attached onto a fringe defining an opening on the top of the toilet 101 for receiving feces and urine. The excretion sensor 1 is communicably connected to the notification device 2 through a wireless or wired communication therebetween.

The toilet 101 has a bottom provided with a water pool part 105. The water pool part 105 is connected to an unillustrated drainage channel for discharging the feces and the urine from the inside of the toilet 101. The feces and the urine excreted in the toilet 101 flow out through the drainage channel. Moreover, a toilet seat 102 is provided on the top of the toilet 101 to allow a user to sit thereon. The toilet seat 102 is rotatable upward and downward. The user sits on the toilet seat 102 lowered to lie on the toilet 101. A water reservoir tank 103 that stores water to cause the feces and urine to flow is provided in the rear of the toilet 101.

The toilet 101 is further provided with a cleansing nozzle 104. The cleansing nozzle 104 sprays out cleansing water upward to cleanse the buttocks (specific portion) of the user. An unillustrated input part instructs start and suspension of a cleansing action by the cleansing nozzle 104.

The excretion sensor 1 includes a processor 11, a memory 12, a camera 13, and a communication part 14.

The processor 11 includes, for example, a central processing unit (CPU). The processor 11 realizes a photographing control part 111.

The photographing control part 111 controls an operation of the camera 13.

For instance, the memory 12 includes a storage device, such as a RAM (Random Access Memory), an SSD (Solid State Drive), or a flash memory, for storing various kinds of information.

The camera 13 is provided to photograph the buttocks of the user sitting on the toilet seat 102. The camera 13 is located at the toilet 101 to photograph an inner part of the toilet 101. In particular, the camera 13 is provided to laterally photograph a lower portion of the buttocks protruding downward from an inside of the toilet seat 102 when the user sits on the toilet seat 102. For instance, the camera 13 has a high sensitivity and a wide angle, and is configured to capture a color image having an R (red) component, a G (green) component, and a B (blue) component. Specifically, the camera 13 includes, for example, a CMOS having a size of one fourth inch with a high sensitivity. The camera 13 is in the form of a wide-angle camera having a horizontal view angle of 120 degrees and a vertical view angle of 45 degrees. The numerical value of each of the inches and the view angles shows just an example, and another numerical value is adoptable. The camera 13 photographs the inner part of the toilet 101 at a predetermined frame rate.

The communication part 14 transmits image data captured by the camera 13 to the notification device 2. Here, the communication part 14 always transmits captured image data to the notification device 2.

The notification device 2 is provided on, for example, a wall of a toilet room at a position visible from the user sitting on the toilet seat 102 and/or a care giver of the user. The notification device 2 includes a processor 21, a memory 22, a display part 23, and a communication part 24.

The communication part 24 receives the image data transmitted by the excretion sensor 1.

For instance, the memory 22 includes a storage device, such as a RAM, an SSD, or a flash memory, for storing various kinds of information. The memory 22 realizes a reference image data storage part 221.

The reference image data storage part 221 stores in advance reference image data for use in detection of a sitting position by a sitting position detection part 212. The reference image data is image data captured every time when excrement is discharged from the water pool part 105. The reference image data is generated, for example, on the basis of a plurality of pieces of color image data obtained by photographing a state of the inner part of the toilet 101 without the user sitting on the toilet seat 102 a plurality of times by the camera 13. In other words, the reference image data represents color image data obtained in a default state of the inner part of the toilet 101 without existence of the buttocks of the user. Therefore, a difference between the reference image data and the image data captured when the user sits on the toilet seat 102 is calculated to extract image data showing the buttocks of the user. The reference image data may represent image data generated through calibration to be executed when the excretion sensor 1 is arranged to the toilet 101.

The toilet 101 is stained as used. In this respect, storage of image data captured every time when excrement is discharged from the water pool part 105 as the reference image data in the reference image data storage part 221 leads to an improvement in a detection accuracy of the buttocks of the user.

The processor 21 includes, for example, a CPU. The processor 21 realizes an image data acquisition part 211, the sitting position detection part 212, and a guidance information output part 213.

The image data acquisition part 211 acquires image data captured by the camera 13 which is provided to photograph the buttocks of the user sitting on the toilet seat 102.

The sitting position detection part 212 detects the sitting position of the user sitting on the toilet seat 102 provided on the toilet 101. The sitting position detection part 212 detects the sitting position by image recognition of the image data acquired by the image data acquisition part 211.

First, the sitting position detection part 212 detects a buttocks image showing the buttocks of the user from the image data acquired by the image data acquisition part 211. Subsequently, the sitting position detection part 212 detects whether a pixel being at a lowest position among pixels constituting the buttocks image in the image data falls within a first region including the water pool part 105 of the toilet 101, a second region in front of the water pool part 105, or a third region in the rear of the water pool part 105.

The guidance information output part 213 outputs, on the basis of the sitting position detected by the sitting position detection part 212, guidance information to guide the user to an appropriate sitting position. The guidance information output part 213 outputs first guidance information indicating that the sitting position of the user is appropriate when the pixel being at the lowest position among the pixels constituting the image of the buttocks in the image data falls within the first region. The guidance information output part 213 outputs second guidance information indicating that the sitting position of the user is in a front portion of the toilet seat 102 to guide the user to the appropriate sitting position when the pixel being at the lowest position among the pixels constituting the image of the buttocks in the image data falls within the second region. The guidance information output part 213 outputs third guidance information indicating that the sitting position of the user is in a rear portion of the toilet seat 102 to guide the user to the appropriate sitting position when the pixel being at the lowest position among the pixels constituting the image of the buttocks in the image data falls within the third region.

The display part 23 includes, for example, a liquid crystal display device. The display part 23 displays guidance information output by the guidance information output part 213.

Next, a sitting position guidance process in the notification device 2 in the first embodiment of the disclosure will be described.

Figure 3:
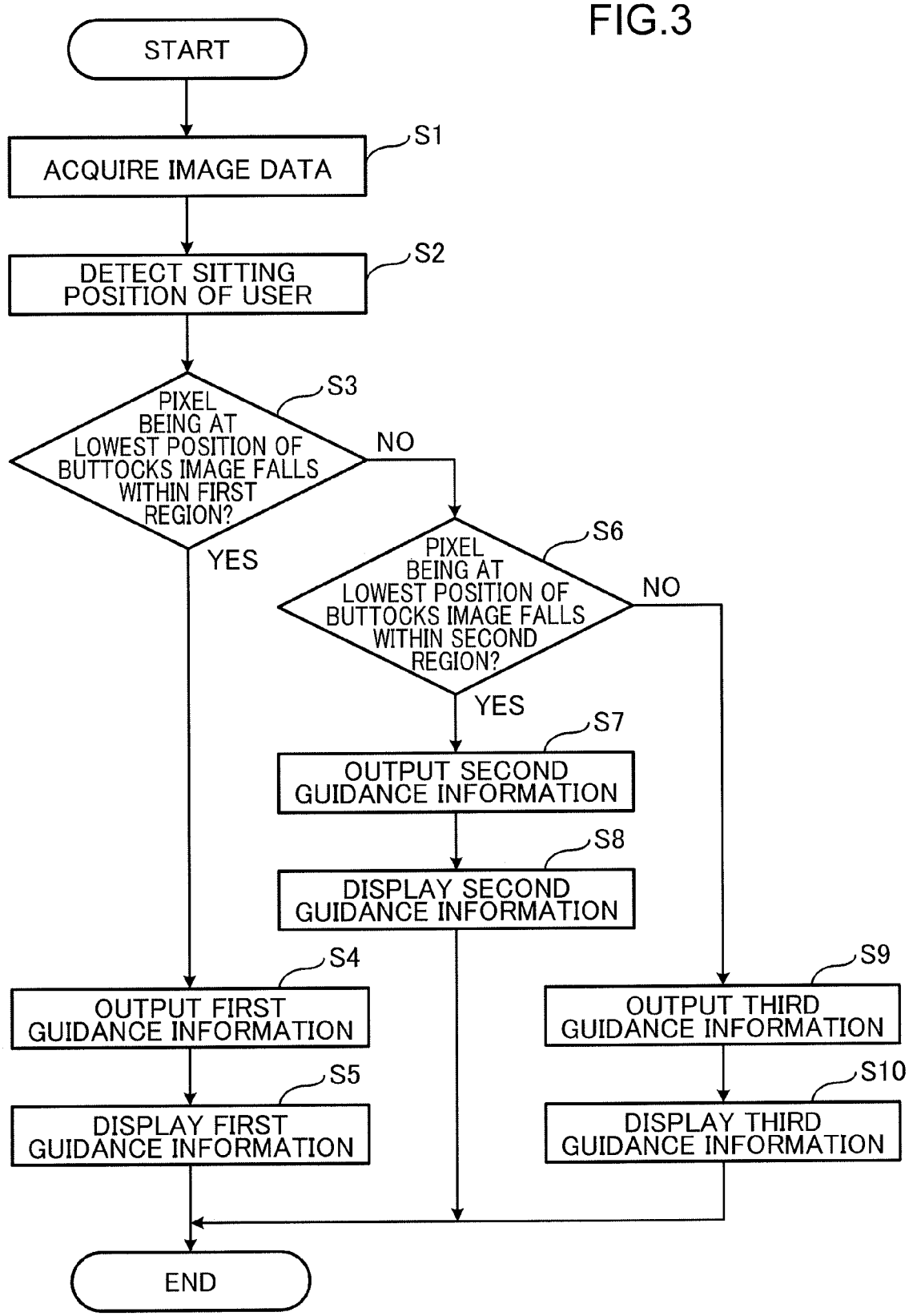
FIG. 3 is a flowchart explaining a sitting position guidance process in the notification device in the first embodiment of the disclosure.

FIG. 3 is a flowchart explaining the sitting position guidance process in the notification device 2 in the first embodiment of the disclosure.

First, in step S1, the image data acquisition part 211 acquires image data captured by the camera 13 which is provided to photograph buttocks of a user sitting on the toilet seat 102. The camera 13 of the excretion sensor 1 photographs a lower portion of the buttocks of the user sitting on the toilet seat from a side. The communication part 14 of the excretion sensor 1 transmits image data captured by the camera 13 to the notification device 2. The communication part 24 of the notification device 2 receives image data transmitted by the excretion sensor 1 and outputs the received image data to the processor 21. The image data acquisition part 211 acquires the image data received by the communication part 24.

Next, in step S2, the sitting position detection part 212 detects a sitting position of the user sitting on the toilet seat 102 provided on the top of the toilet 101 by image recognition of the image data acquired by the image data acquisition part 211.

Here, detection of the sitting position by the sitting position detection part 212 will be described.

Figure 4:
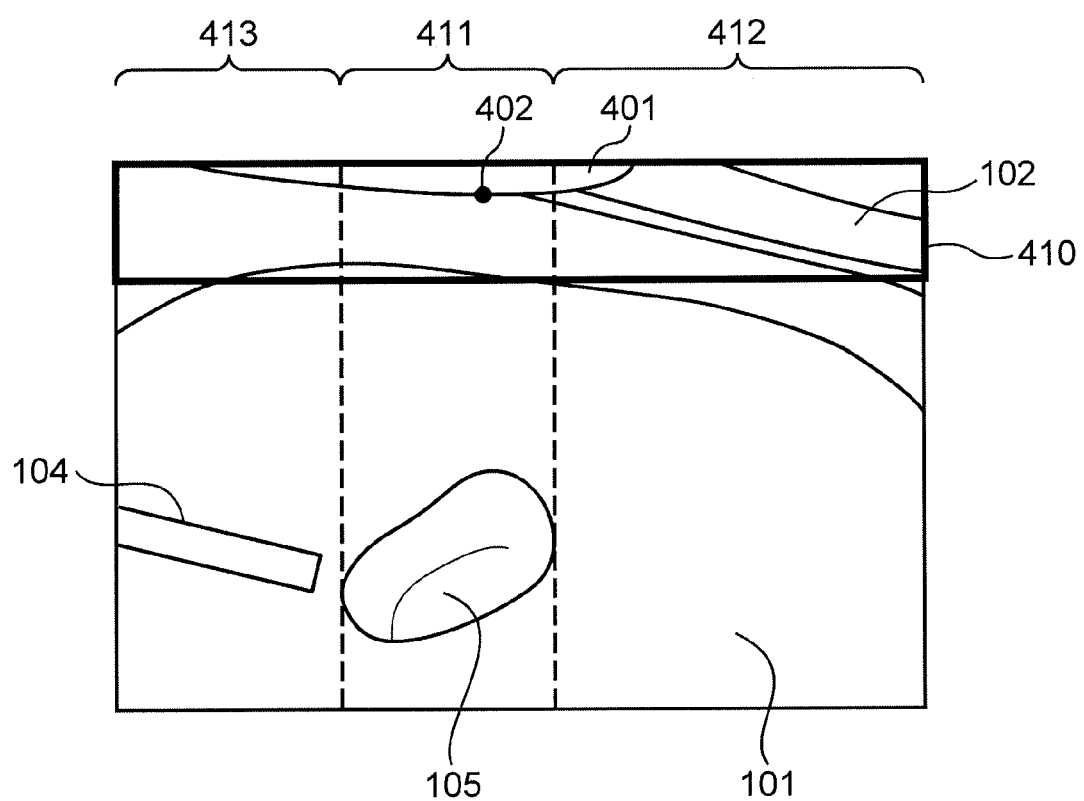
FIG. 4 is an illustration of an example of image data acquirable when a sitting position of a user is appropriate in the first embodiment.
Figure 5:
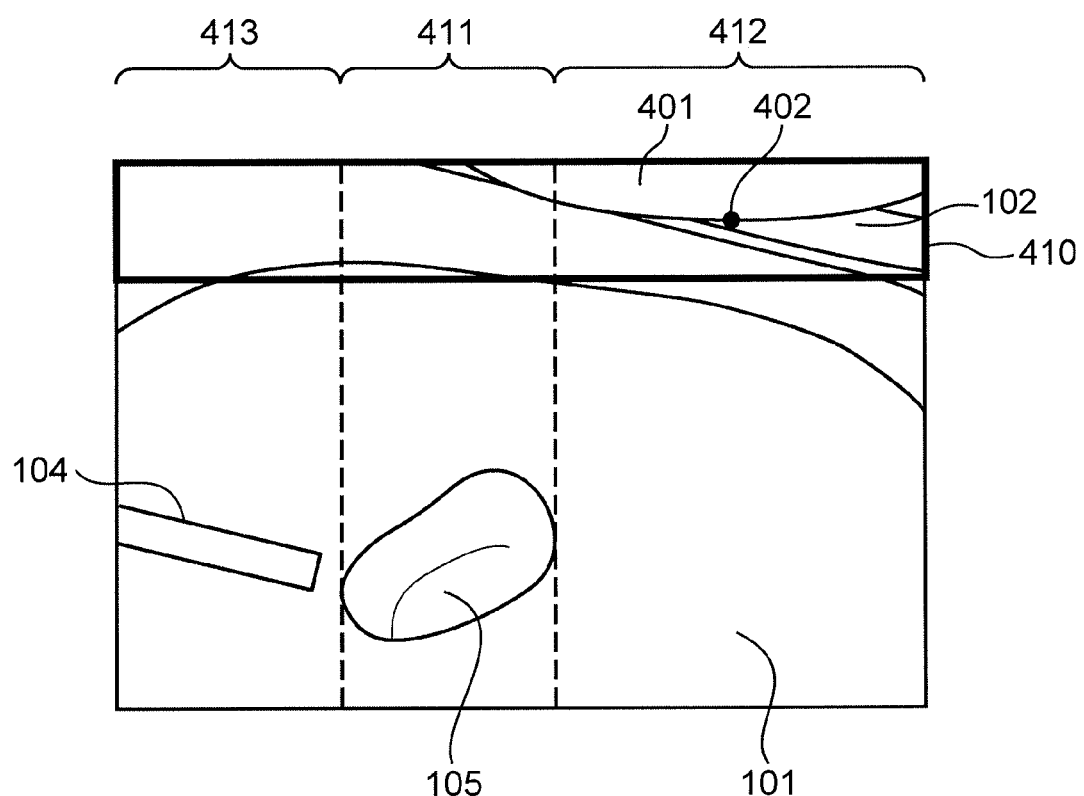
FIG. 5 is an illustration of an example of image data acquirable when a sitting position of the user is in a front portion of a toilet seat in the first embodiment.
Figure 6:
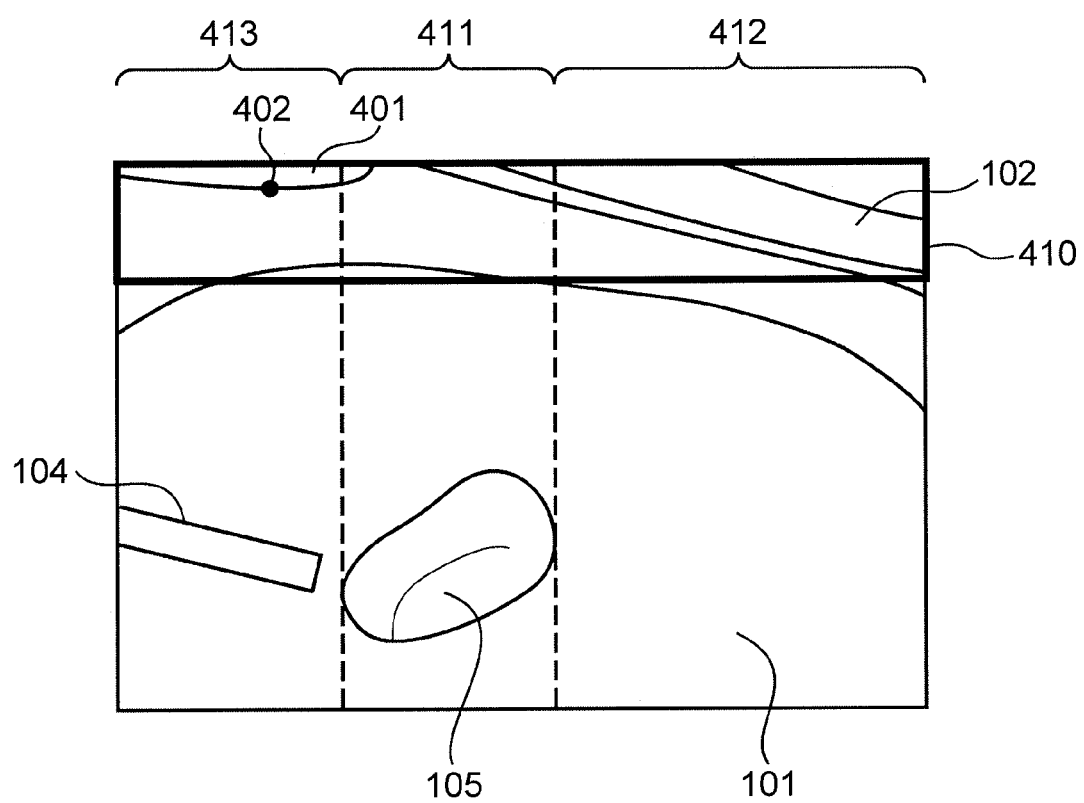
FIG. 6 is an illustration of an example of image data acquirable when a sitting position of the user is in a rear portion of the toilet seat in the first embodiment.

FIG. 4 is an illustration of an example of image data acquirable when a sitting position of the user is appropriate in the first embodiment. FIG. 5 is an illustration of an example of image data acquirable when a sitting position of the user is in the front portion of the toilet seat 102 in the first embodiment. FIG. 6 is an illustration of an example of image data acquirable when a sitting position of the user is in the rear portion of the toilet seat 102 in the first embodiment. A right side in each of FIG. 4 to FIG. 6 indicates a front position of the user sitting on the toilet seat 102, and a left side in each of FIG. 4 to FIG. 6 indicates a rear position of the user sitting on the toilet seat 102.

As shown in FIG. 4 to FIG. 6, the image data includes a buttocks detection area 410 which is preset for detecting buttocks 401 of a user. For instance, the buttocks detection area 410 is a topmost area among four areas obtained by vertically dividing the image data into quarters. The lower portion of the buttocks of the user sitting on the toilet seat 102 is reflected in an upper portion of the image data. The sitting position detection part 212 detects a buttocks image showing the buttocks of the user from the buttocks detection area 410 in the image data.

When the user does not sit on the toilet seat 102, the image data includes the toilet seat 102, and the inner part and the water pool part 105 of the toilet 101. When the user sits on the toilet seat 102, the image data includes the buttocks 401 of the user, the toilet seat 102, and the inner part and the water pool part 105 of the toilet 101.

At this time, the sitting position detection part 212 calculates a difference between the image data acquired by the image data acquisition part 211 and the reference image data stored in the reference image data storage part 221. Subsequently, the sitting position detection part 212 calculates an RGB ratio of an R component, a G component, and a B component in each pixel contained in the calculated difference image data. Then, the sitting position detection part 212 calculates a total number of pixels whose calculated RGB ratio falls within a predetermined skin reference ratio range. The RGB ratio represents, for example, a ratio of a luminance value of the R component, a luminance value of the G component, and a luminance value of the B component in each pixel in the difference image data. The skin reference ratio range represents a range of a typical skin RGB ratio calculated by analyzing a plurality of pieces of image data including various skin images. Finally, the sitting position detection part 212 determines that the image data captured by the camera 13 includes a buttocks image when the total number of pixels whose calculated RGB ratio falls within the predetermined skin reference ratio range is a threshold or larger. The skin reference ratio may be set in accordance with a main color of the skin of the user who uses the toilet room.

In detection of the buttocks 401 in the buttocks detection area 410, the sitting position detection part 212 detects whether a pixel 402 being at a lowest position among pixels constituting the buttocks image in the image data falls within a first region 411 including the water pool part 105 of the toilet 101, a second region 412 in front of the water pool part 105, or a third region 413 in the rear of the water pool part 105. The second region 412 is located in front of the first region 411, and the third region 413 is located in the rear of the first region 411.

When the buttocks 401 of the user sitting on the toilet seat 102 are laterally viewed, the lowest portion of the buttocks 401 is estimated to generally correspond to the position of the anus of the user. When the user is sitting in an optimal sitting position, excreted feces falls to the water pool part 105. It is seen from this perspective that the sitting position of the user is appropriate when the anus of the user is located above the water pool part 105. As shown in FIG. 4, therefore, it can be said that the sitting position of the user is appropriate when the pixel 402 being at the lowest position among the pixels constituting the buttocks image in the image data falls within the first region 411 including the water pool part 105 of the toilet 101. As shown in FIG. 5, it can be further said that the sitting position of the user is in the front portion of the toilet seat 102 when the pixel 402 being at the lowest position among the pixels constituting the buttocks image in the image data falls within the second region 412 in front of the water pool part 105. As shown in FIG. 6, it can be further said that the sitting position of the user is in the rear portion of the toilet seat 102 when the pixel 402 being at the lowest position among the pixels constituting the buttocks image in the image data falls within the third region 413 in the rear of the water pool part 105.

Referring back to FIG. 3, subsequently, in step S3, the guidance information output part 213 determines whether the pixel 402 being at the lowest position of the buttocks image falls within the first region 411. When the pixel 402 being at the lowest position of the buttocks image is determined to fall within the first region 411 (YES in step S3), the guidance information output part 213 outputs, to the display part 23, the first guidance information indicating that the sitting position of the user is appropriate in step S4.

Then, in step S5, the display part 23 displays the first guidance information. The display part 23 displays, for example, a sentence saying, "Sitting position of the user is appropriate."

By contrast, when the pixel 402 being at the lowest position of the buttocks image is determined not to fall within the first region 411 (NO in step S3), the guidance information output part 213 determines whether the pixel 402 being at the lowest position of the buttocks image falls within the second region 412 in step S6. When the pixel 402 being at the lowest position of the buttocks image is determined to fall within the second region 412 (YES in step S6), the guidance information output part 213 outputs, to the display part 23, the second guidance information indicating that the sitting position of the user is in the front portion of the toilet seat 102 to guide the user to an appropriate sitting position in step S7.

Then, in step S8, the display part 23 displays the second guidance information. The display part 23 displays, for example, a sentence saying, "User is sitting in a front portion, and thus adjust the sitting position rearward." The user having confirmed the displayed second guidance information shifts the buttocks rearward. In a case where the user is a care receiver, a care giver of the user may shift the user rearward after confirming the displayed second guidance information.

By contrast, when the pixel 402 being at the lowest position of the buttocks image is determined not to fall within the second region 412, in other words, when the pixel 402 being at the lowest position of the buttocks image is determined to fall within the third region 413 (NO in step S6), the guidance information output part 213 outputs, to the display part 23, the third guidance information indicating that the sitting position of the user is in the rear portion of the toilet seat 102 to guide the user to an appropriate sitting position in step S9.

Subsequently, in step S10, the display part 23 displays the third guidance information. The display part 23 displays, for example, a sentence saying, "User is sitting in a rear portion, and thus adjust the sitting position frontward." The user having confirmed the displayed third guidance information shifts the buttocks frontward. In a case where the user is a care receiver, a care giver of the user may shift the user frontward after confirming the displayed third guidance information.

The user having been guided to the appropriate sitting position in this manner can excrete in the appropriate sitting position. This thus achieves prevention of the toilet, the periphery therearound, and a garment of the user from being stained. Further, the toilet, the periphery therearound, and the garment of the user can be kept clean. This additionally attains reduction in a burden on a care giver to clean the toilet, the periphery therearound, and a garment of a care receiver who serves as the user.

In the first embodiment, it is unnecessary to change the sitting position of the user when the sitting position of the user is appropriate, and thus, the display part 23 may exclude displaying of the first guidance information indicating that the sitting position of the user is appropriate. Specifically, the guidance information output part 213 may exclude outputting the first guidance information indicating that the sitting position of the user is appropriate when the pixel 402 being at the lowest position of the buttocks image is determined to fall within the first region 411.

Although the guidance information output part 213 expresses each of the first guidance information, the second guidance information, and the third guidance information in a sentence in the first embodiment, the present disclosure is not particularly limited thereto. Each of the first guidance information, the second guidance information, and the third guidance information may be expressed in an icon. For instance, the guidance information output part 213 may allow an icon indicating that the sitting position of the user is appropriate to be displayed when the pixel 402 being at the lowest position of the buttocks image is determined to fall within the first region 411, may allow an icon indicating that the sitting position of the user is in the front portion to be displayed when the pixel 402 being at the lowest position of the buttocks image is determined to fall within the second region 412, and may allow an icon indicating that the sitting position of the user is in the rear portion to be displayed when the pixel 402 being at the lowest position of the buttocks image is determined to fall within the third region 413.

Alternatively, the guidance information output part 213 may express each of the first guidance information, the second guidance information, and the third guidance information by lighting an LED (light emitting diode). The guidance information output part 213 may change a display state of the LED in accordance with the sitting position of the user. For instance, the guidance information output part 213 may light a blue LED when the pixel 402 being at the lowest position of the buttocks image is determined to fall within the first region 411, and may light a red LED when the pixel 402 being at the lowest position of the buttocks image is determined to fall within the second region 412 or the third region 413. Alternatively, for example, the guidance information output part 213 may light a predetermined color LED when the pixel 402 being at the lowest position of the buttocks image is determined to fall within the first region 411, and may flush the predetermined light LED when the pixel 402 being at the lowest position of the buttocks image is determined to fall within the second region 412 or the third region 413.

The notification device 2 may include a speaker in place of the display part 23. In this case, the guidance information output part 213 may output the first guidance information, the second guidance information, or the third guidance information to the speaker, and the speaker may output the first guidance information, the second guidance information, or the third guidance information with a voice or a sound. For instance, when outputting the first guidance information with a voice, the speaker may output a voice saying, "Sitting position of the user is appropriate." For instance, when outputting the second guidance information with a voice, the speaker may output a voice saying, "User is sitting in a front portion, and thus adjust the sitting position rearward." For instance, when outputting the third guidance information with a voice, the speaker may output a voice saying, "User is sitting in a rear portion, and thus adjust the sitting position frontward." For instance, the guidance information output part 213 may cause the speaker to output a warning sound or a buzzer sound when the pixel 402 being at the lowest position of the buttocks image is determined to fall within the second region 412 or the third region 413.

Alternatively, the notification device 2 may include both the display part 23 and the speaker.

Although the excretion sensor 1 includes the camera 13, and the sitting position detection part 212 detects the sitting position by image recognition of the image data in the first embodiment, this disclosure is not particularly limited thereto. The excretion sensor 1 may include a plurality of transmissive photoelectric sensors on an inner side surface of the toilet seat 102. Each of the transmissive photoelectric sensors includes a light emitter that emits infrared light beams, and a light receiver provided to face the light emitter to receive the infrared light beams emitted by the light emitter. When the user sits on the toilet seat 102, the buttocks sinking downward from the toilet seat 102 block the infrared light beams emitted from the light emitter, which suspends the light receiver from receiving the infrared light beams. The sitting position detection part 212 detects the sitting position of the user by specifying a transmissive photoelectric sensor which stops receiving infrared light beams among the transmissive photoelectric sensors.

For instance, the sitting position detection part 212 may output the first guidance information indicating that the sitting position of the user is appropriate when a transmissive photoelectric sensor located above the water pool part 105 stops receiving infrared light beams. For instance, the sitting position detection part 212 may output the second guidance information indicating that the sitting position of the user is in the front portion of the toilet seat 102 to guide the user to an appropriate sitting position when a transmissive photoelectric sensor located in front of the water pool part 105 stops receiving infrared light beams. For instance, the sitting position detection part 212 may output the third guidance information indicating that the sitting position of the user is in the rear portion of the toilet seat 102 to guide the user to an appropriate sitting position when a transmissive photoelectric sensor located in the rear of the water pool part 105 stops receiving the infrared light beams.

The excretion sensor 1 may include a plurality of load sensors on a seat surface of the toilet seat 102. Each of the load sensors detects a load value in a vertical direction. The memory 22 may store in advance a load value of each load sensor obtained when the user sits in the appropriate sitting position, a load value of each load sensor obtained when the user sits in the front portion, and a load value of each load sensor obtained when the user sits in the rear portion. The sitting position detection part 212 may determine whether the sitting position of the user is appropriate, is in the front portion, or is in the rear portion by comparing a load value detected by each load sensor with the load value of each load sensor stored in the memory 22.

The excretion sensor 1 may further include a distance measurement sensor for measuring a distance to the center of the opening of the toilet seat 102. The sitting position detection part 212 may output the first guidance information when a pixel being at a lowest position of a buttocks image falls within the first region and a distance measured by the distance measurement sensor is a predetermined distance. The sitting position detection part 212 may output the second guidance information when the pixel being at the lowest position of the buttocks image falls within the second region and no distance is measured by the distance measurement sensor. The sitting position detection part 212 may output the third guidance information when the pixel being at the lowest position of the buttocks image falls within the third region and no distance is measured by the distance measurement sensor.

Second Embodiment

In the first embodiment, guidance information to guide a user to an appropriate sitting position is output on the basis of a detected sitting position. By contrast, in the second embodiment, a cleansed position of buttocks of a user is determined on the basis of a detected sitting position, a position of a cleansing nozzle is determined, on the basis of the determined cleansed position, to cleanse the buttocks of the user, and a control signal is generated to control the cleansing nozzle to come to the determined position of the cleansing nozzle.

Figure 7:
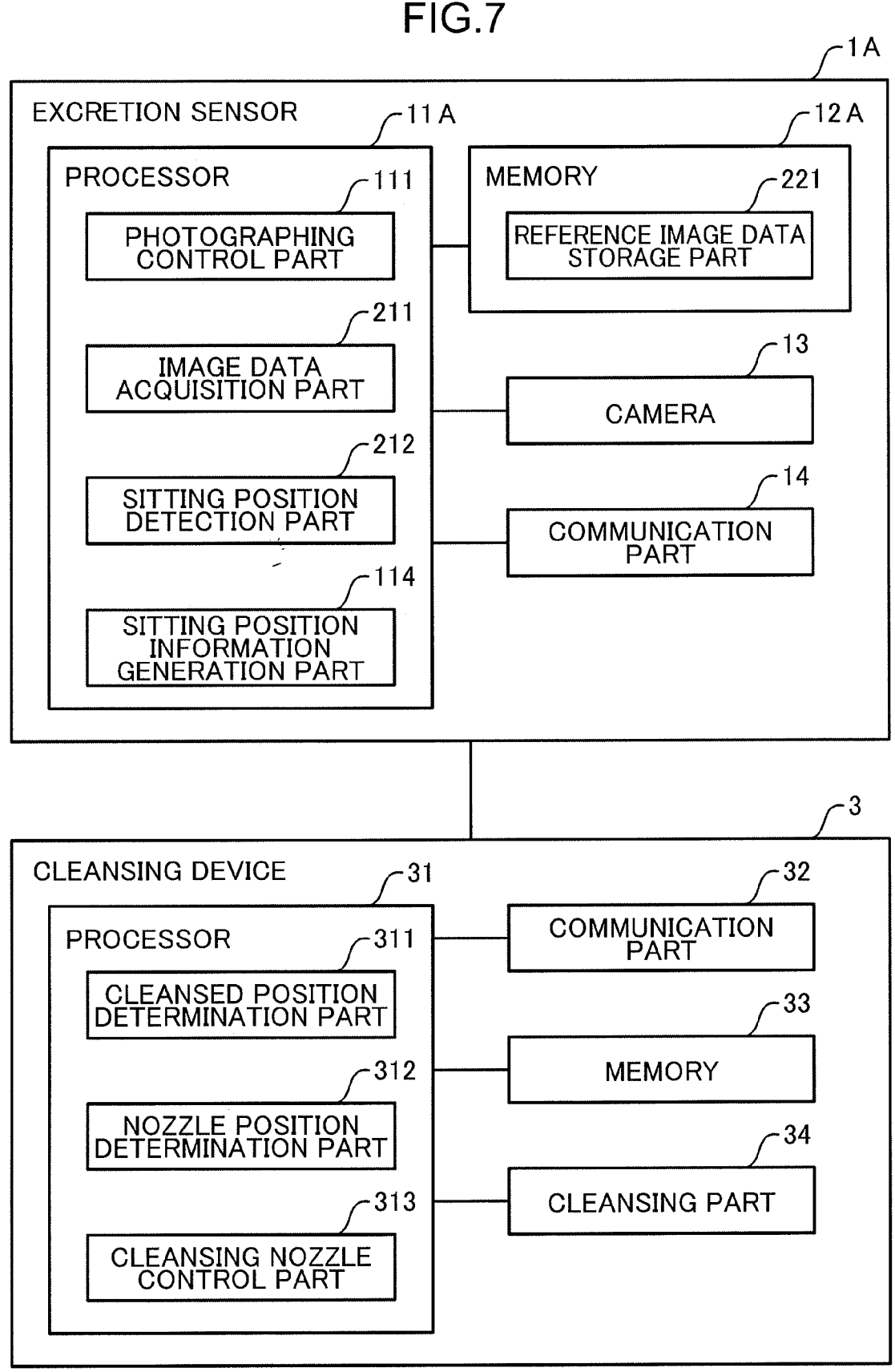
FIG. 7 is a diagram showing a configuration of a cleansing system in a second embodiment of the disclosure.
Figure 8:
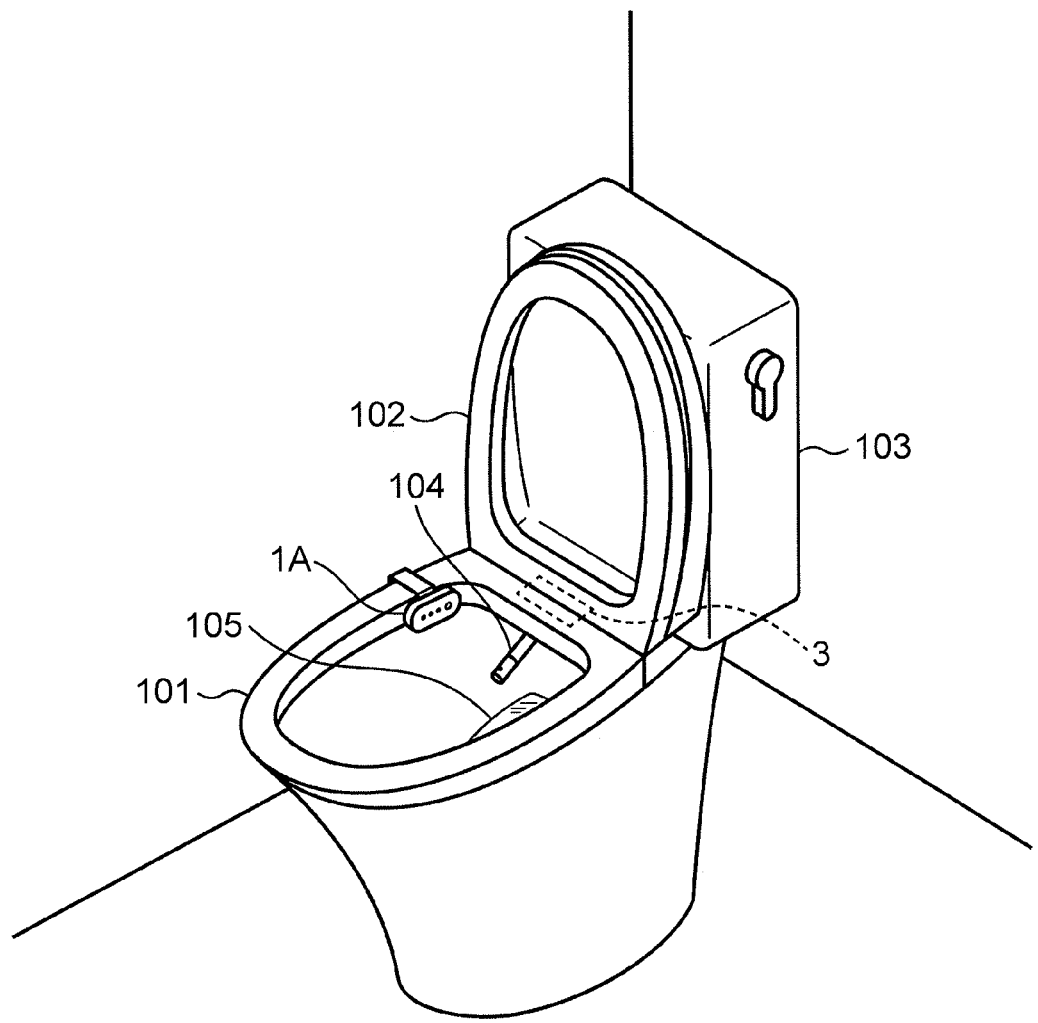
FIG. 8 is a view explaining arrangement positions of an excretion sensor and a cleansing device in the second embodiment of the disclosure.

FIG. 7 is a diagram showing a configuration of a cleansing system in the second embodiment of the disclosure. FIG. 8 is a view explaining arrangement positions of an excretion sensor 1A and a cleansing device 3 in the second embodiment of the disclosure. In the second embodiment, elements which are the same as those in the first embodiment are given the same reference signs and numerals, and thus explanation therefor will be omitted.

The cleansing system shown in FIG. 7 includes the excretion sensor 1A and the cleansing device 3.

The excretion sensor 1A is provided in a toilet 101 in the same manner as the first embodiment. The excretion sensor 1A is communicably connected to the cleansing device 3 through a wireless or wired communication therebetween.

The excretion sensor 1A includes a processor 11A, a memory 12A, a camera 13, and a communication part 14.

The processor 11A realizes a photographing control part 111, an image data acquisition part 211, a sitting position detection part 212, and a sitting position information generation part 114. The memory 12A realizes a reference image data storage part 221.

The sitting position information generation part 114 generates sitting position information indicating a sitting position of a user sitting on a toilet seat 102. The sitting position information includes a distance from a predetermined reference position to a pixel being at a lowest position of a buttocks image. The reference position indicates, for example, an intersection between a line extending upward from the center of the water pool part 105 and a line horizontally extending from the pixel being at the lowest position of the buttocks image.

The communication part 14 transmits the sitting position information generated by the sitting position information generation part 114 to the cleansing device 3.

The cleansing device 3 is embedded in the toilet seat 102. The cleansing device 3 includes a processor 31, a communication part 32, a memory 33, and a cleansing part 34.

The communication part 32 receives the sitting position information transmitted by the excretion sensor 1A.

For instance, the memory 33 includes a storage device, such as a RAM, an SSD, or a flash memory, for storing various kinds of information.

The processor 31 includes, for example, a CPU. The processor 31 realizes a cleansed position determination part 311, a nozzle position determination part 312, and a cleansing nozzle control part 313.

The cleansed position determination part 311 determines, on the basis of a sitting position detected by the sitting position detection part 212, a cleansed position of the buttocks of the user.

The nozzle position determination part 312 determines, on the basis of the cleansed position determined by the cleansed position determination part 311, a position of a cleansing nozzle 104 to cleanse the buttocks of the user.

The cleansing nozzle control part 313 generates a control signal to control the cleansing nozzle 104 to come to the position of the cleaning nozzle 104 determined by the nozzle position determination part 312. The cleansing nozzle control part 313 generates a control signal to spray cleansing water out of the cleansing nozzle 104 or suspend the cleansing water from being spayed out. The cleansing nozzle control part 313 further generates a control signal to regulate a pressure of the cleansing water being sprayed out of the cleansing nozzle 104. The cleansing nozzle control part 313 outputs each generated control signal to the cleansing part 34.

The cleansing part 34 drives the cleansing nozzle 104 to extend or contract the cleansing nozzle 104 in response to a control signal generated by the cleansing nozzle control part 313. The cleansing part 34 further allows the cleansing water to be sprayed out of the cleansing nozzle 104 or suspends the cleansing water from being sprayed out in response to a control signal generated by the cleansing nozzle control part 313. The cleansing part 34 regulates a pressure of the cleansing water being splayed out of the cleansing nozzle 104 in response to a control signal generated by the cleansing nozzle control part 313.

Next, a cleansing process in the excretion sensor 1A and the cleansing device 3 in the second embodiment of the disclosure will be described.

Figure 9:
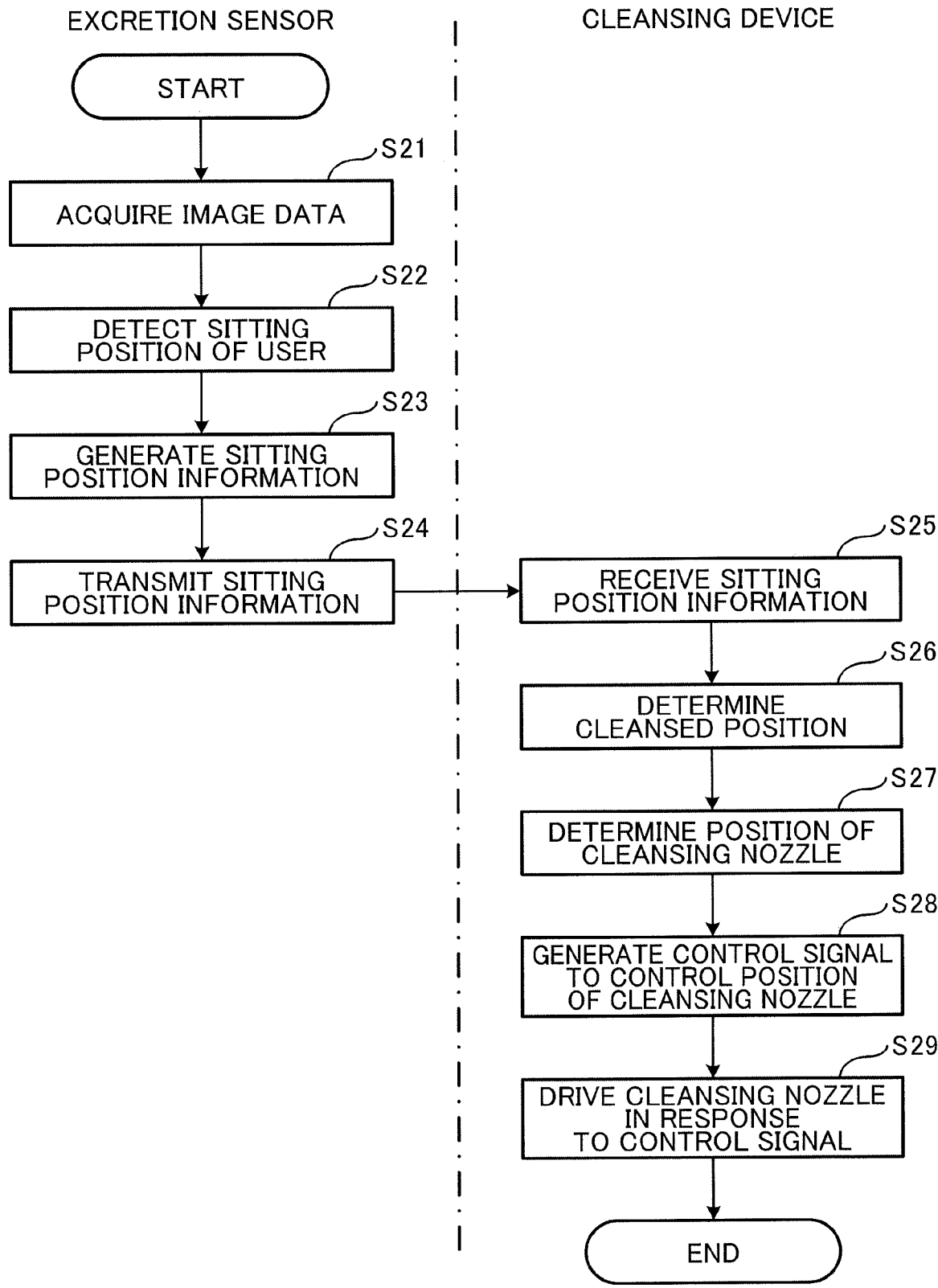
FIG. 9 is a flowchart explaining a cleansing process in the excretion sensor and the cleansing device in the second embodiment of the disclosure.

FIG. 9 is a flowchart explaining the cleansing process in the excretion sensor 1A and the cleansing device 3 in the second embodiment of the disclosure.

Step S21 and step S22 are the same as step S1 and step S2 in FIG. 3, and thus the explanations therefor are omitted.

Subsequently, in step S23, the sitting position information generation part 114 generates, on the basis of a sitting position detected by the sitting position detection part 212, sitting position information indicating a sitting position of a user sitting on the toilet seat 102. A pixel being at a lowest position of a buttocks image in the image data corresponds to the sitting position. The sitting position information includes a distance from a predetermined reference position to the pixel being at the lowest position of the buttocks image in image data. For instance, in a definition of a front position of a user as a positive value and a definition of a rear position of the user as a negative value, a distance of +10 centimeters in the sitting position information indicates a 10 centimeter-frontward displaced sitting position from the reference position, and a distance of −10 centimeters in the sitting position information indicates a 10 centimeter-rearward displaced sitting position from the reference position.

Then, in step S24, the communication part 14 transmits the sitting position information generated by the sitting position information generation part 114 to the cleansing device 3.

Next, in step S25, the communication part 32 of the cleansing device 3 receives the sitting position information transmitted by the excretion sensor 1A.

Thereafter, in step S26, the cleansed position determination part 311 determines, on the basis of the sitting position detected by the sitting position detection part 212, a cleansed position of the buttocks of the user. The cleansed position represents a position that the cleansing water sprayed out of the cleansing nozzle 104 hits the buttocks. The cleansed position determination part 311 determines the cleansed position in accordance with a distance from the reference position to the sitting position each included in the sitting position information received by the communication part 32. That is to say, the distance from the reference position to the sitting position results in a distance from the reference position to the cleansed position.

Subsequently, in step S27, the nozzle position determination part 312 determines, on the basis of the cleansed position determined by the cleansed position determination part 311, a position of the cleansing nozzle 104 to cleanse the buttocks of the user. The reference position of the cleansing nozzle 104 corresponding to a reference position on the image data is predetermined. The memory 33 stores in advance the reference position of the cleansing nozzle 104 corresponding to the reference position on the image data. For instance, the reference position of the cleansing nozzle 104 is suitable position for spraying out cleansing water toward an intersection between a perpendicular line passing through the center of the water pool part 105 and an opening plane of the toilet seat 102. The cleansing nozzle 104 is extendable and contractable. The cleansing nozzle 104 diagonally extends and contracts in a downward direction at a known tilt angle with respect to the horizontal direction. The cleansing nozzle 104 further sprays out the cleansing water at a right angle to the extending and contracting direction of the cleansing nozzle 104. The nozzle position determination part 312 thus can calculate, on the basis of the distance from the reference position to the cleansed position, a length of the cleansing nozzle 104 to be extended or contracted, and can determine the position of the cleansing nozzle 104.

Next, in step S28, the cleansing nozzle control part 313 generates a control signal to control the cleansing nozzle 104 to come to a position of the cleaning nozzle 104 determined by the nozzle position determination part 312. The cleansing nozzle control part 313 outputs the generated control signal to the cleansing part 34.

Subsequently, in step S29, the cleansing part 34 drives the cleansing nozzle 104 so that the cleansing nozzle 104 extends or contracts in response to a control signal from the cleansing nozzle control part 313. The cleansing part 34 may cause the extended or contracted cleansing nozzle 104 to automatically spray out cleansing water, or may spray out the cleansing water in accordance with an instruction from the user. Specifically, when an unillustrated input part receives an input by the user to start cleansing, the cleansing part 34 may allow the cleansing water to be sprayed out.

A position of the cleansing nozzle 104 is determined on the basis of the sitting position of the user to cleanse the buttocks of the user as described above. This consequently can keep the cleansing water to be sprayed out of the cleansing nozzle 104 from hitting a portion other than the buttocks, and prevent the toilet 101, the periphery therearound, and the garment of the user from being stained.

Although the cleansing device 3 determines a cleansed position, determines a position of the cleansing nozzle 104, and generates a control signal to control the position of the cleansing nozzle 104 in the second embodiment, this disclosure is not particularly limited thereto. The excretion sensor 1A may determine a cleansed position, a position of the cleansing nozzle 104, and generate a control signal to control the position of the cleansing nozzle 104. In this case, the processor 11A of the excretion sensor 1A excludes the sitting position information generation part 114, and the communication part 14 transmits no sitting position information to the cleansing device 3. The processor 11A may have the cleansed position determination part 311, the nozzle position determination part 312, and a control signal generation part. The control signal generation part may generate a control signal to control the position of the cleansing nozzle 104 in the same manner as the cleansing nozzle control part 313. The communication part 14 may transmit the control signal generated by the control signal generation part to the cleansing device 3. The communication part 32 of the cleansing device 3 may receive the control signal transmitted by the excretion sensor 1A, and the cleansing nozzle control part 313 may output the control signal received by the communication part 32 to the cleansing part 34.

Although the excretion sensor 1A includes the image data acquisition part 211, the sitting position detection part 212, and the reference image data storage part 221 in the second embodiment, this disclosure is not particularly limited thereto. The cleansing device 3 may include the image data acquisition part 211, the sitting position detection part 212, and the reference image data storage part 221. In this case, the communication part 14 of the excretion sensor 1A transmits image data to the cleansing device 3.

As described heretofore, the cleansing device 3 may include: the sitting position detection part 212 that detects a sitting position of a user sitting on the toilet seat provided on the toilet: the cleansed position determination part 311 that determines, on the basis of the detected sitting position, a cleansed position of the buttocks of the user; the nozzle position determination part 312 that determines, on the basis of the determined cleansed position, a position of the cleansing nozzle to cleanse the buttocks of the user; and the cleansing nozzle control part 313 or signal generation part that generates a control signal to control the position of the cleansing nozzle to come to the determined position of the cleansing nozzle.

The guidance system in the first embodiment may further include the cleansing device 3 in the second embodiment. In this case, the notification device 2 may include the sitting position information generation part 114, and the communication part 24 may transmit sitting position information to the cleansing device 3. The notification device 2 may further include the cleansed position determination part 311, the nozzle position determination part 312, and the control signal generation part.

Third Embodiment

In a third embodiment, when a user starts excretion while water is sprayed out of a cleansing nozzle 104 to buttocks of the user, a pressure of the cleansing water being sprayed out of the cleansing nozzle is reduced or the cleansing water is suspended from being sprayed out of the cleansing nozzle.

Figure 10:
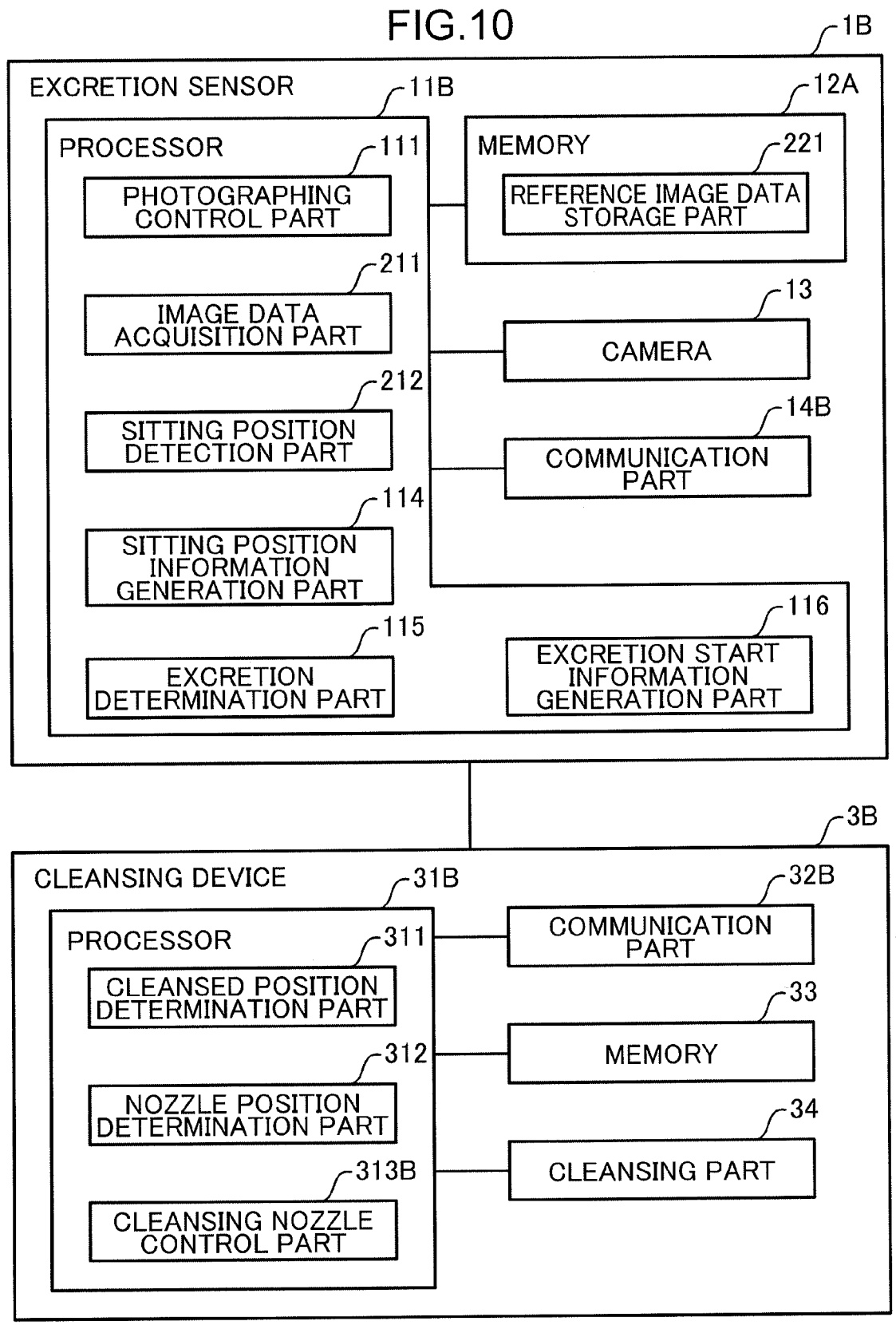
FIG. 10 is a diagram showing a configuration of a cleansing system in a third embodiment of the disclosure.

FIG. 10 is a diagram showing a configuration of a cleansing system in the third embodiment of the disclosure. Arrangement positions of an excretion sensor 1B and a cleansing device 3B in the third embodiment are the same as the arrangement positions of the excretion sensor 1A and the cleansing device 3 shown in FIG. 8. In the third embodiment, elements which are the same as those in the first embodiment and the second embodiment are given the same reference signs and numerals, and thus explanation therefor will be omitted.

The cleansing system shown in FIG. 10 includes the excretion sensor 1B and the cleansing device 3B.

The excretion sensor 1B is provided in a toilet 101 in the same manner as the first embodiment. The excretion sensor 1B is communicably connected to the cleansing device 3B through a wireless or wired communication therebetween.

The excretion sensor 1B includes a processor 11B, a memory 12A, a camera 13, and a communication part 14B.

The processor 11B realizes a photographing control part 111, an image data acquisition part 211, a sitting position detection part 212, a sitting position information generation part 114, an excretion determination part 115, and an excretion start information generation part 116.

The excretion determination part 115 determines whether the user has started excretion. The excretion determination part 115 calculates a difference image between reference image data indicating a sate of an inner part of a toilet without excrement and acquired image data. The excretion determination part 115 determines whether the image data includes an image of the excrement on the basis of luminances of color components of the difference image. The excretion determination part 115 determines that the user has started excretion when determining that the image data includes an image of the excrement.

The excretion start information generation part 116 generates excretion start information indicating that the user has started excretion when the excretion determination part 115 determines that the user has started the excretion.

The communication part 14B transmits sitting position information generated by the sitting position information generation part 114 to the cleansing device 3B. The communication part 14B transmits the excretion start information generated by the excretion start information generation part 116 to the cleansing device 3B.

The cleansing device 3B is embedded in a toilet seat 102 in the same manner as the second embodiment. The cleansing device 3B includes a processor 31B, a communication part 32B, a memory 33, and a cleansing part 34.

The communication part 32B receives the sitting position information transmitted by the excretion sensor 1B. The communication part 32B further receives the excretion start information transmitted by the excretion sensor 1B.

The processor 31B includes, for example, a CPU. The processor 31B realizes a cleansed position determination part 311, a nozzle position determination part 312, and a cleansing nozzle control part 313B.

The cleansing nozzle control part 313B generates a control signal to control the position of the cleansing nozzle 104 to come to a position of the cleaning nozzle 104 determined by the nozzle position determination part 312. The cleansing nozzle control part 313B generates a control signal to spray cleansing water out of the cleansing nozzle 104 or suspend the cleansing water from being spayed out. The cleansing nozzle control part 313B generates a control signal to cause the cleansing nozzle 104 to spay out the cleansing water for encouraging defecation by stimulating the buttocks of the user after adjusting the position of the cleansing nozzle 104 to come to the position of the cleansing nozzle 104 determined by the nozzle position determination part 312. The cleansing nozzle control part 313B generates a control signal to regulate a pressure of the cleansing water being sprayed out of the cleansing nozzle 104. The cleansing nozzle control part 313B generates a control signal to suspend the cleansing water from being sprayed out of the cleansing nozzle 104 to stimulate the buttocks of the user when it is determined that the user has started the excretion. The cleansing nozzle control part 313B outputs each generated control signal to the cleansing part 34.

In the third embodiment, the cleansing nozzle control part 313B may generate a control signal to reduce a pressure of the cleansing water being sprayed out of the cleansing nozzle 104 to stimulate the buttocks of the user when it is determined that the user has started the excretion.

Next, a cleansing process in the excretion sensor 1B and the cleansing device 3B in the third embodiment of the disclosure will be described.

Figure 11:
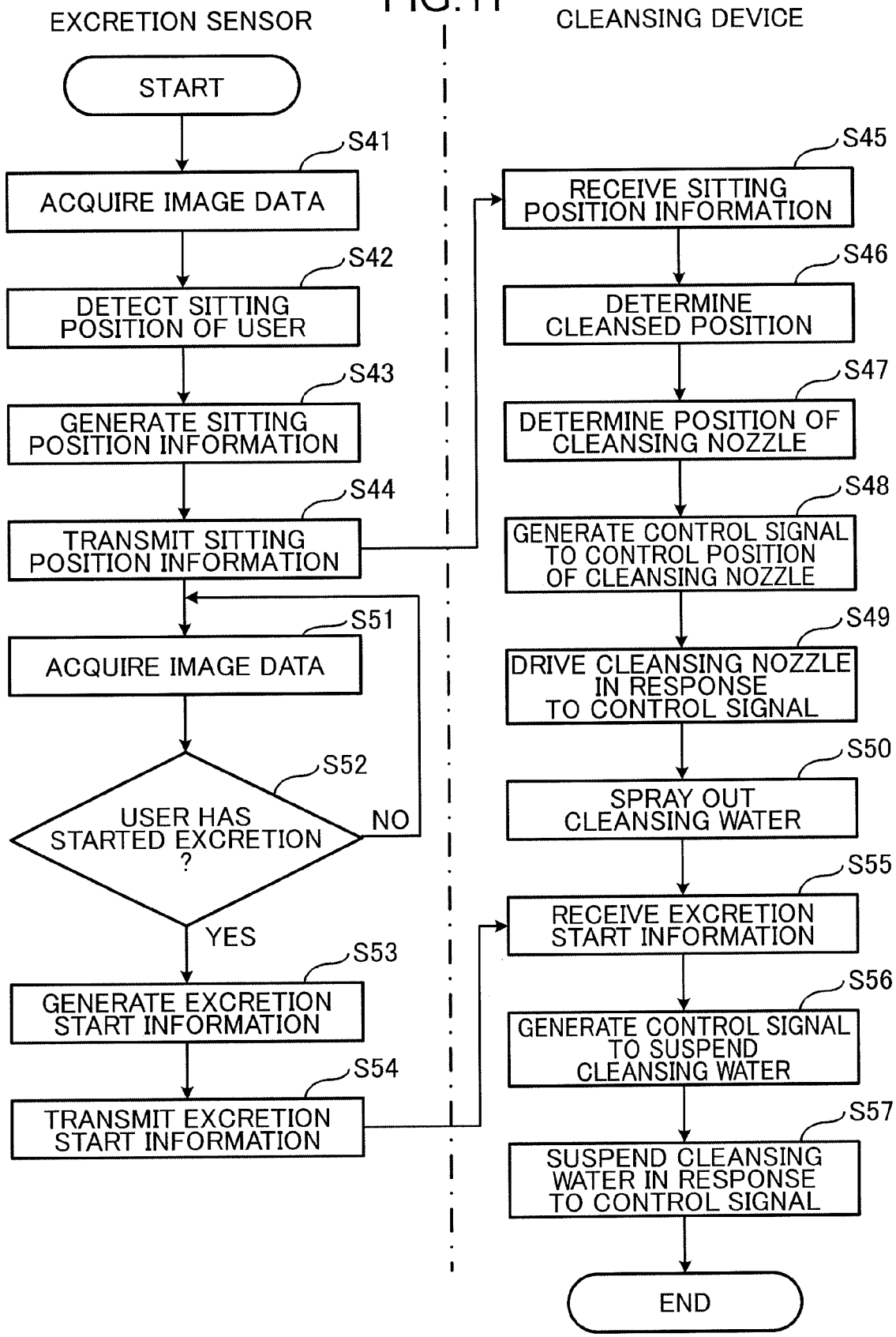
FIG. 11 is a flowchart explaining a cleansing process in an excretion sensor and a cleansing device in the third embodiment of the disclosure.

FIG. 11 is a flowchart explaining the cleansing process in the excretion sensor 1B and the cleansing device 3B in the third embodiment of the disclosure.

Step S41 and step S42 are the same as step S1 and step S2 shown in FIG. 3, and step S43 to step S49 are the same as step S23 to step S29 shown in FIG. 9, and thus explanations for these steps are omitted.

Subsequently, in step S50, the cleansing part 34 allows the cleansing water to be automatically sprayed out. The spraying-out of the cleansing water here is not intended for cleansing the buttocks but is intended for encouraging excretion by stimulating the anus of the user. That is to say, the user has not excreted yet at this time.

Then, in step S51, the image data acquisition part 211 acquires image data captured by the camera 13.

Thereafter, in step S52, the excretion determination part 115 determines whether the user has started excretion.

Here, determination by the excretion determination part 115 as to whether the user has started excretion will be described.

Figure 12:
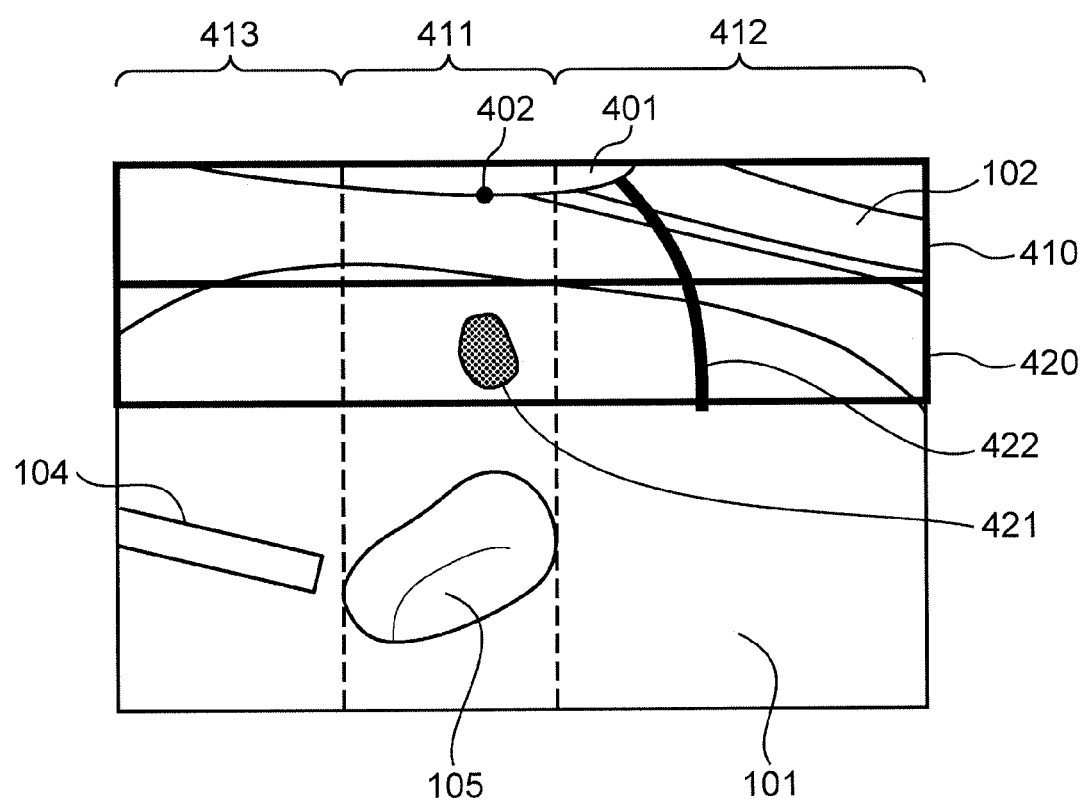
FIG. 12 is an illustration of an example of image data acquirable when a user starts defecation or urination in the third embodiment.

FIG. 12 is an illustration of an example of image data acquirable when the user starts defecation or urination in the third embodiment. A right side in FIG. 12 indicates a front position of the user sitting on the toilet seat 102, and a left side in FIG. 12 indicates a rear position of the user sitting on the toilet seat 102.

As shown in FIG. 12, the image data includes a buttocks detection area 410 which is preset for detecting buttocks 401 of the user and an excrement detection area 420 which is preset for detecting feces 421 and urine 422 excreted from the user. For instance, the buttocks detection area 410 is a topmost area among four areas obtained by vertically dividing the image data into quarters. Further, for instance, the excrement detection area 420 is a second area from the top among the four areas obtained by vertically dividing the image data into quarters. The excretion determination part 115 detects, from the excrement detection area 420 in the image data, a feces image showing feces or a urine image showing urine, the feces and the urine having been excreted from the user.

At this time, the excretion determination part 115 calculates a difference between the image data acquired by the image data acquisition part 211 and reference image data stored in a reference image data storage part 221. The reference image data is image data captured every time when excrement is discharged from a water pool part 105. The reference image data is generated, for example, on the basis of a plurality of pieces of color image data obtained by photographing a state of an inner part of the toilet 101 without defecation and urination by the camera 13 a plurality of times. In other words, the reference image data represents color image data obtained in a default state of the inner part of the toilet 101 without defecation and urination. Therefore, image data showing defecation or urination is extracted by calculating a difference between the reference image data and image data captured at the defecation or the urination.

Subsequently, the excretion determination part 115 calculates an RGB ratio of an R component, a G component, and a B component in each pixel contained in the calculated difference image data. Then, the excretion determination part 115 calculates a total number of pixels whose calculated RGB ratio falls within a predetermined defecation reference ratio range. The RGB ratio represents, for example, a ratio of a luminance value of the R component, a luminance value of the G component, and a luminance value of the B component in each pixel in the difference image data. The defecation reference ratio range represents a typical defecation RGB ratio range calculated by analyzing a plurality of pieces of image data including various defecation images. Finally, the excretion determination part 115 determines that the image data captured by the camera 13 includes a feces image when the total number of pixels whose calculated RGB ratio falls within the predetermined defecation reference ratio range is a threshold or larger.

The excretion determination part 115 may determine whether the image data includes a urine image in the same manner as the process for the feces image. Specifically, the excretion determination part 115 calculates a total number of pixels whose calculated RGB ratio in the difference image falls within a predetermined urination reference ratio range. The excretion determination part 115 may determine that the image data captured by the camera 13 includes the urine image when the total number of pixels whose calculated RGB ratio falls within the predetermined urination reference ratio range is a threshold or larger.

The excretion determination part 115 determines that the user has started excretion when determining that the image data includes at least one of the feces image and the urine image. The excretion determination part 115 determines that the user has not started excretion when determining that the image data includes neither the feces image nor the urine image.

Here, when it is determined that the user has not started the excretion (NO in step S52), the process returns to step S51.

By contrast, when it is determined that the user has started the excretion (YES in step S52), the excretion start information generation part 116 generates excretion start information indicating that the user has started the excretion in step S53.

Next, in step S54, the communication part 14B transmits the excretion start information generated by the excretion start information generation part 116 to the cleansing device 3B.

Subsequently, in step S55, the communication part 32B of the cleansing device 3B receives the excretion start information transmitted by the excretion sensor 1B.

Then, in step S56, the cleansing nozzle control part 313B generates a control signal to suspend the cleansing water from being sprayed out of the cleansing nozzle 104. The cleansing nozzle control part 313B outputs the generated control signal to the cleansing part 34.

Thereafter, in step S57, the cleansing part 34 suspends the cleansing water from being sprayed out of the cleansing nozzle 104 in response to the control signal from the cleansing nozzle control part 313B. The cleansing part 34 may suspend the cleansing water in accordance with an instruction from the user in a period from a start of automatic spraying-out of the cleansing water in step S50 to a receipt of excretion start information. Specifically, when an unillustrated input part receives an input by the user to suspend the cleansing, the cleansing part 34 may suspend the cleansing water.

In a case where it is determined that the user has started excretion while the cleansing water is sprayed out of the cleansing nozzle 104 to the buttocks of the user as described above, a pressure of the cleansing water being sprayed out of the cleansing nozzle 104 is reduced or the cleansing water is suspended from being sprayed out of the cleansing nozzle 104. This consequently can avoid dispersion of reflected water deriving from the cleansing water having hit the excrement therearound, and thus can prevent the toilet 101, the periphery therearound, and the garment of the user from being stained.

The excretion sensor 1B may determine a cleansed position, a position of the cleansing nozzle 104, and generate a control signal to control the position of the cleansing nozzle 104 in the third embodiment as well. In this case, the processor 11B of the excretion sensor 1B excludes the sitting position information generation part 114, and the communication part 14B transmits no sitting position information to the cleansing device 3B. The processor 11B may have the cleansed position determination part 311, the nozzle position determination part 312, and a control signal generation part. The control signal generation part may generate a control signal to control the position of the cleansing nozzle 104 in the same manner as the cleansing nozzle control part 313B. The communication part 14B may transmit the control signal generated by the control signal generation part to the cleansing device 3B. The communication part 32B of the cleansing device 3B may receive the control signal transmitted by the excretion sensor 1B, and the cleansing nozzle control part 313B may output the control signal received by the communication part 32B to the cleansing part 34.

The excretion sensor 1B may further generate a control signal to suspend the cleansing water from being sprayed out of the cleansing nozzle 104. In this case, the processor 11B of the excretion sensor 1B excludes the excretion start information generation part 116, and the communication part 14B transmits no excretion start information to the cleansing device 3B. The processor 11B may have a control signal generation part. The control signal generation part may generate a control signal to suspend the cleansing water from being sprayed out of the cleansing nozzle 104 in the same manner as the cleansing nozzle control part 313B. The communication part 14B may transmit the control signal generated by the control signal generation part to the cleansing device 3B. The communication part 32B of the cleansing device 3B may receive the control signal transmitted by the excretion sensor 1B, and the cleansing nozzle control part 313B may output the control signal received by the communication part 32B to the cleansing part 34.

Although the excretion sensor 1B includes the image data acquisition part 211, the sitting position detection part 212, the excretion determination part 115, and the reference image data storage part 221 in the third embodiment, this disclosure is not particularly limited thereto. The cleansing device 3B may include the image data acquisition part 211, the sitting position detection part 212, the excretion determination part 115, and the reference image data storage part 221. In this case, the communication part 14B of the excretion sensor 1B transmits image data to the cleansing device 3B.

As described above, the cleansing device 3B may include: the excretion determination part 115 that determines whether a user sitting on the toilet seat provided on the top of the toilet has started excretion; and the cleansing nozzle control part 313B or signal generation part that generates a control signal to reduce a pressure of the cleansing water being splayed out of the cleansing nozzle to cleanse the buttocks of the user, or suspend the cleansing water from being sprayed out of the cleansing nozzle when it is determined that the user has started excretion.

Although the excretion determination part 115 determines, by using image data, whether the user has started excretion in the third embodiment, this disclosure is not particularly limited thereto. The excretion sensor 1B may include a microphone that acquires sound data in the toilet 101, and the excretion determination part 115 may determine whether the sound data acquired by the microphone includes a defecation sound or a urination sound. The excretion determination part 115 may then determine that the user has started the excretion when the sound data includes the defecation sound or the urination sound.

Alternatively, in the third embodiment, the excretion sensor 1B may include a temperature sensor that measures a temperature in the toilet 101, and the excretion determination part 115 may determine whether the temperature in the toilet 101 measured by the temperature sensor is a threshold or higher. The excretion determination part 115 may determine that the user has started the excretion when the temperature in the toilet 101 indicates the threshold or higher.

Further alternatively, in the third embodiment, the excretion sensor 1B may include a hydrogen sulfide odor sensor having a high sensitivity to a hydrogen sulfide odor or an ammonia odor sensor having a high sensitivity to an ammonia odor, and the excretion determination part 115 may determine whether odor data measured by the hydrogen sulfide odor sensor or the ammonia odor sensor indicates a threshold or higher. The excretion determination part 115 may then determine that the user has started excretion when the odor data indicates the threshold or higher.

The guidance system in the first embodiment may further include the cleansing device 3B in the third embodiment. In this case, the notification device 2 may include the sitting position information generation part 114, the excretion determination part 115, and the excretion start information generation part 116. The communication part 24 may transmit sitting position information and excretion start information to the cleansing device 3B. The notification device 2 may further include the excretion determination part 115, the cleansed position determination part 311, the nozzle position determination part 312, and a control signal generation part.

Fourth Embodiment

An elderly user has a tendency that fat of the buttocks thereof gradually reduces in accordance with a physical change along with his/her aging. When the buttocks of the user are smaller than an opening of a toilet seat, the buttocks may sink into the toilet. In this case, the user may feel a pain in excretion with an uncomfortable posture to keep the buttocks from sinking into the toilet. Such excretion in the state of the buttocks sinking into the toilet may result in staining the toilet, the periphery therearound, and a garment of the user.

In this respect, in a fourth embodiment, it is determined whether the buttocks of the user sink into the toilet, and warning information about a warning of the sinking of the buttocks of the user into the toilet is output when the buttocks are determined to sink into the toilet.

Figure 13:
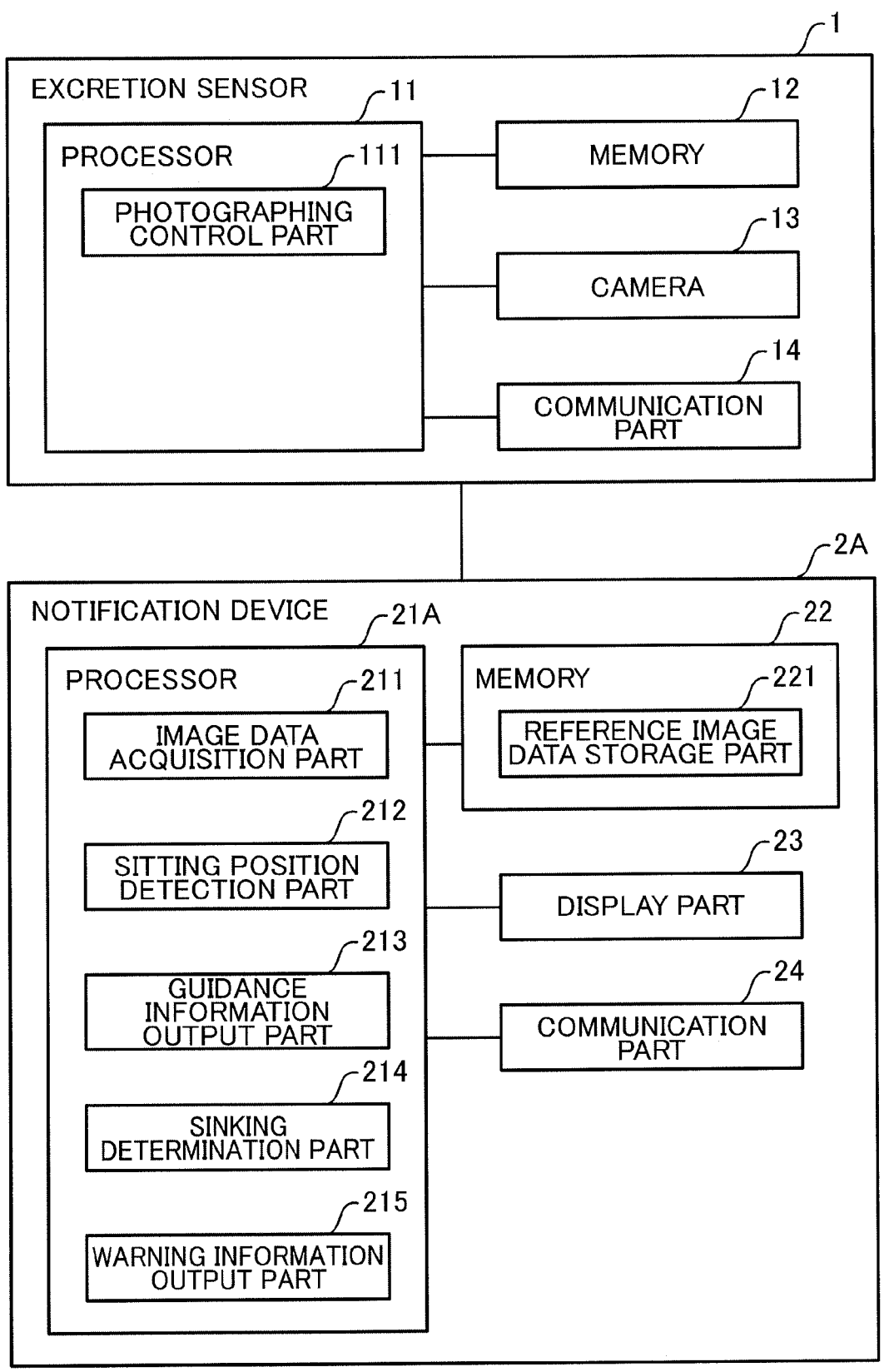
FIG. 13 is a diagram showing a configuration of a guidance system in a fourth embodiment of the disclosure.

FIG. 13 is a diagram showing a configuration of a guidance system in the fourth embodiment of the disclosure. Arrangement positions of an excretion sensor 1 and a notification device 2A in the fourth embodiment are the same as the arrangement positions of the excretion sensor 1 and the notification device 2 shown in FIG. 2. In the fourth embodiment, elements which are the same as those in the first embodiment are given the same reference signs and numerals, and thus explanation therefor will be omitted.

The guidance system shown in FIG. 13 includes the excretion sensor 1 and the notification device 2A.

The notification device 2A includes a processor 21A, a memory 22, a display part 23, and a communication part 24.

The processor 21A includes, for example, a CPU. The processor 21A realizes an image data acquisition part 211, a sitting position detection part 212, a guidance information output part 213, a sinking determination part 214, and a warning information output part 215.

The sinking determination part 214 determines whether the buttocks of the user sink into the toilet 101 by image recognition of image data. The sinking determination part 214 determines the sinking of the buttocks into the toilet 101 when a distance from an upper end of the image data to a pixel being at a lowest position among pixels constituting an image of the buttocks in the image data is a predetermined distance or longer.

The warning information output part 215 outputs warning information about a warning of the sinking of the buttocks of the user into the toilet 101 when the sinking determination part 214 determines that the buttocks sink into the toilet 101.

The display part 23 displays guidance information output by the guidance information output part 213. The display part 23 further displays the warning information output by the warning information output part 215.

Next, a sitting position guidance process in the notification device 2A in the fourth embodiment of the disclosure will be described.

Figure 14:
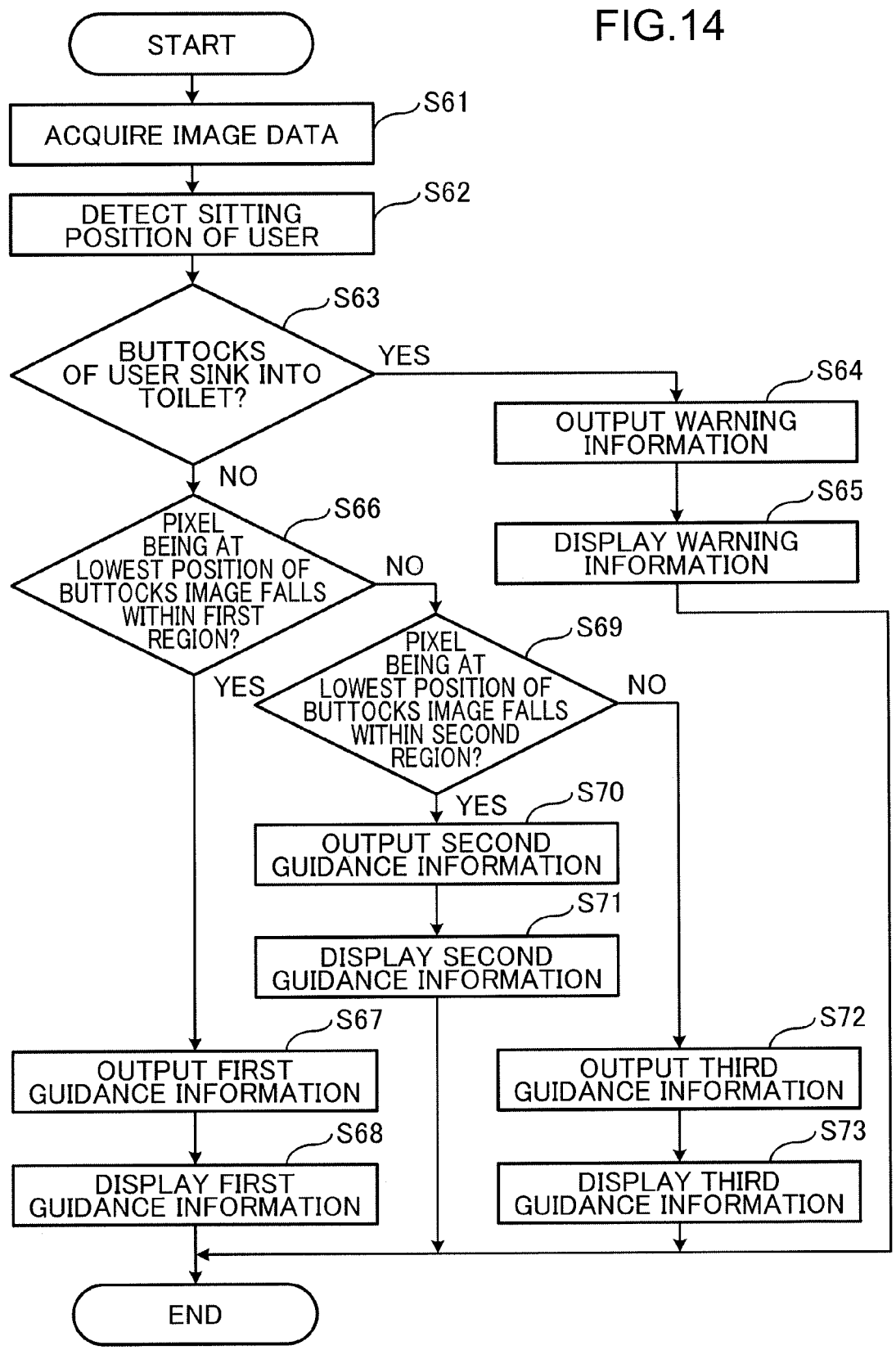
FIG. 14 is a flowchart explaining a sitting position guidance process in a notification device in the fourth embodiment of the disclosure.

FIG. 14 is a flowchart explaining the sitting position guidance process in the notification device 2A in the fourth embodiment of the disclosure.

Step S61 and step S62 are the same as step S1 and step S2 shown in FIG. 3, and thus the explanations therefor are omitted.

Subsequently, in step S63, the sinking determination part 214 determines whether buttocks of a user sink into the toilet 101 by image recognition of image data. The sinking determination part 214 determines the sinking of the buttocks into the toilet 101 when a distance from an upper end of the image data to a pixel being at a lowest position among pixels constituting an image of the buttocks in the image data is a predetermined distance or longer. The sinking determination part 214 further determines no sinking of the buttocks into the toilet 101 when the distance from the upper end of the image data to the pixel being at the lowest position among the pixels constituting the image of the buttocks in the image data is shorter than the predetermined distance. The predetermined distance to be compared with varies depending on a shape and a size of the toilet seat. Hence, the predetermined distance is preset in accordance with a kind of the toilet seat.

Here, when the buttocks of the user are determined to sink into the toilet 101 (YES in step S63), the warning information output part 215 outputs warning information about a warning of the sinking of the buttocks of the user into the toilet 101 in step S64.

Then, the display part 23 displays the warning information in step S65. The display part 23 displays, for example, a sentence saying, "Buttocks of the user sink into the toilet." The warning information is intended for giving a warning to a care giver who cares the user. The care giver assists the user or attaches an auxiliary toilet seat to the toilet seat after confirming the displayed warning information. The auxiliary toilet seat is attachable onto the toilet seat 102 and has an opening narrower than an opening of the toilet seat 102.

The warning information may include information for encouraging use of the auxiliary toilet seat attachable onto the toilet seat 102 and having the opening narrower than the opening of the toilet seat 102. The display part 23 displays, for example, a sentence saying, "Buttocks of the user sink into the toilet, and thus use an auxiliary toilet seat."

By contrast, when the buttocks of the user are determined not to sink into the toilet 101 (NO in step S63), the guidance information output part 213 determines whether a pixel 402 being at a lowest position of a buttocks image falls within a first region 411 in step S66.

Step S66 to step S73 are the same as step S3 to step S10 shown in FIG. 3, and thus the explanations therefor are omitted.

As described above, when the buttocks of the user are determined to sink into the toilet 101, warning information about a warning of the sinking of the buttocks of the user into the toilet 101 is output. In response, the care giver of the user having confirmed the warning information can assist the user, or attach an auxiliary toilet seat having an opening narrower than an opening of the toilet seat to the toilet seat. This succeeds in relieving a pain of the user in the excretion, and preventing the toilet 101, the periphery therearound, and the garment of the user from being stained.

Although the warning information output part 215 expresses the warning information in a sentence in the fourth embodiment, this disclosure is not particularly limited thereto. The warning information may be expressed in an icon. For instance, the warning information output part 215 may allow an icon indicating the sinking of the buttocks of the user into the toilet 101 to be displayed.

The warning information output part 215 may express the warning information by lighting an LED. For instance, the warning information output part 215 may light a blue LED when the buttocks of the user are determined not to sink into the toilet 101, and may light a red LED when the buttocks of the user are determined to sink into the toilet 101.

The notification device 2A may include a speaker in place of the display part 23. In this case, the warning information output part 215 may output the warning information to the speaker, and the speaker may output the warning information with a voice or a sound. For instance, when outputting the warning information with the voice, the speaker may output a voice saying, "Buttocks of the user sink into the toilet." For instance, the warning information output part 215 may cause the speaker to output a warning sound or a buzzer sound when the buttocks of the user are determined to sink into the toilet 101.

Alternatively, the notification device 2A may include both the display part 23 and the speaker.

The excretion sensor 1 may further include a distance measurement sensor for measuring a distance to the center of the opening of the toilet seat 102. The sinking determination part 214 may determine that the buttocks of the user sink into the toilet 101 when the distance to the buttocks measured by the distance measurement sensor is a predetermined distance or shorter.

As described heretofore, the notification device 2A may include: a sinking determination part that determines whether buttocks of a user sitting on a toilet seat provided on a toilet sink into the toilet; and a warning information output part that outputs warning information about a warning of the sinking of the buttocks of the user into the toilet when the buttocks are determined to sink into the toilet.

The guidance system in the fourth embodiment may further include the cleansing device 3 in the second embodiment. In this case, the notification device 2A may include the sitting position information generation part 114. The communication part 24 may transmit sitting position information to the cleansing device 3.

The guidance system in the fourth embodiment may further include the cleansing device 3B in the third embodiment. In this case, the notification device 2A may include the sitting position information generation part 114, the excretion determination part 115, and the excretion start information generation part 116. The communication part 24 may transmit sitting position information and excretion start information to the cleansing device 3B.

In the embodiments, each constituent element may be realized with dedicated hardware or by executing a software program suitable for the constituent element. Each constituent element may be realized by a program execution unit, such as a CPU or a processor, reading out and executing a software program recorded on a recording medium, such as a hard disk or a semiconductor memory. Other independent computer system may implement a program by recording the program in a recording medium to be transferred, or transferring the program via a network.

Apart or all of functions of the device according to the embodiment of the disclosure are typically realized as a large scale integration (LSI), which is an integrated circuit. These functions may be formed as separate chips, or some or all of the functions may be included in one chip. The circuit integration is not limited to the LSI, and may be realized with a dedicated circuit or a general-purpose processor. A field programmable gate array (FPGA) that is programmable after manufacturing of an LSI or a reconfigurable processor in which connections and settings of circuit cells within the LSI are reconfigurable may be used.

A part or all of functions of the device according to the embodiment of the present disclosure may be implemented by a processor, such as a CPU executing a program.

Numerical values used above are merely illustrative to be used to specifically describe the present disclosure, and thus the present disclosure is not limited to the illustrative numerical values.

Order in which steps shown in the flowcharts are executed is merely illustrative to be used to specifically describe the present disclosure, and thus steps may be executed in order other than the above order as long as similar effects are obtained. Some of the steps may be executed simultaneously (in parallel) with other steps.

The technology according to the present disclosure achieves prevention of a toilet, a periphery therearound, and a garment of a user from being stained, and thus is useful as a technology of guiding the user sitting on a toilet seat to an appropriate sitting position.

The invention claimed is:

1. An information processing device, comprising:
an image data acquisition part that acquires image data captured by a camera which is provided to photograph buttocks of a user sitting on a toilet seat;
a sitting position detection part that detects a sitting position of the user sitting on the toilet seat by image recognition of the image data; and
a guidance information output part that outputs, on the basis of the detected sitting position, guidance information to guide the user to an appropriate sitting position, wherein
the sitting position detection part detects whether a pixel at a lowest position among pixels comprising an image of the buttocks in the image data falls within a first region including a water pool part of the toilet, a second region in front of the water pool part, or a third region to the rear of the water pool part, and
the guidance information output part outputs
first guidance information indicating that the sitting position of the user is appropriate when the pixel at the lowest position among the pixels constituting the image of the buttocks in the image data falls within the first region,
second guidance information indicating that the sitting position of the user is in a front portion of the toilet seat when the pixel at the lowest position among the pixels constituting the image of the buttocks in the image data falls within the second region, or
third guidance information indicating that the sitting position of the user is in a rear portion of the toilet seat when the pixel at the lowest position among the pixels constituting the image of the buttocks in the image data falls within the third region.

2. The information processing device according to claim 1, further comprising:
an excretion determination part that determines whether the user has started excretion; and
a signal generation part that generates a control signal to reduce a pressure of cleansing water being sprayed out of a cleansing nozzle to cleanse the buttocks of the user, or to suspend the cleansing water from being sprayed out of the cleansing nozzle when it is determined that the user has started excretion.

3. The information processing device according to claim 2,
further comprising an image data acquisition part that acquires image data captured by a camera which is provided to photograph an inner part of the toilet, wherein
the excretion determination part
calculates a difference image between reference image data indicating a state of the inner part of the toilet without excrement and the acquired image data, determines whether the image data includes an image of the excrement on the basis of the luminance of each of the color components of the difference image, and determines that the user has started the excretion when it is determined that the image data includes the image of the excrement.

4. An information processing device comprising:
a sitting position detection part that detects a sitting position of a user sitting on a toilet seat provided on a toilet;
a guidance information output part that outputs, on the basis of the detected sitting position, guidance information to guide the user to an appropriate sitting position;
a sinking determination part that determines whether buttocks of the user sink into the toilet; and
a warning information output part that outputs warning information about a warning of the sinking of the buttocks of the user into the toilet when the buttocks are determined to sink into the toilet.

5. The information processing device according to claim 4, further comprising an image data acquisition part that acquires image data captured by a camera which is provided to photograph the buttocks of the user sitting on the toilet seat, wherein
the sinking determination part determines the sinking of the buttocks into the toilet when a distance from an upper end of the image data to a pixel being at a lowest position among pixels constituting an image of the buttocks in the image data is a predetermined distance or longer.

6. The information processing device according to claim 4, wherein the warning information includes information for encouraging use of an auxiliary toilet seat attachable onto the toilet seat and having an opening narrower than an opening of the toilet seat.

7. An information processing device comprising:
a sitting position detection part that detects a sitting position of a user sitting on a toilet seat provided on a toilet;
a guidance information output part that outputs, on the basis of the detected sitting position, guidance information to guide the user to an appropriate sitting position;
a cleansed position determination part that determines, on the basis of the detected sitting position, a cleansed position of buttocks of the user;
a nozzle position determination part that determines, on the basis of the determined cleansed position, a position of a cleansing nozzle to cleanse the buttocks of the user; and
a signal generation part that generates a control signal to control the cleansing nozzle to come to the determined position of the cleaning nozzle.

8. An information processing method performed by a computer, comprising:
acquiring image data captured by a camera which is provided to photograph buttocks of a user sitting on a toilet seat;
detecting a sitting position of the user sitting on the toilet seat by image recognition of the image data; and
outputting, on the basis of the detected sitting position, guidance information to guide the user to an appropriate sitting position, wherein
the detecting operation detects whether a pixel at a lowest position among pixels comprising an image of the buttocks in the image data falls within a first region including a water pool part of the toilet, a second region in front of the water pool part, or a third region to the rear of the water pool part, and
the outputting operation outputs
first guidance information indicating that the sitting position of the user is appropriate when the pixel at the lowest position among the pixels constituting the image of the buttocks in the image data falls within the first region,
second guidance information indicating that the sitting position of the user is in a front portion of the toilet seat when the pixel at the lowest position among the pixels constituting the image of the buttocks in the image data falls within the second region, or
third guidance information indicating that the sitting position of the user is in a rear portion of the toilet seat when the pixel at the lowest position among the pixels constituting the image of the buttocks in the image data falls within the third region.

9. A non-transitory computer readable recording medium storing an information processing program for causing a computer to function as:
an image data acquisition part that acquires image data captured by a camera which is provided to photograph buttocks of a user sitting on a toilet seat;
a sitting position detection part that detects a sitting position of the user sitting on the toilet seat by image recognition of the image data; and
a guidance information output part that outputs, on the basis of the detected sitting position, guidance information to guide the user to an appropriate sitting position, wherein
the sitting position detection part detects whether a pixel at a lowest position among pixels comprising an image of the buttocks in the image data falls within a first region including a water pool part of the toilet, a second region in front of the water pool part, or a third region to the rear of the water pool part, and
the guidance information output part outputs
first guidance information indicating that the sitting position of the user is appropriate when the pixel at the lowest position among the pixels constituting the image of the buttocks in the image data falls within the first region,
second guidance information indicating that the sitting position of the user is in a front portion of the toilet seat when the pixel at the lowest position among the pixels constituting the image of the buttocks in the image data falls within the second region, or
third guidance information indicating that the sitting position of the user is in a rear portion of the toilet seat when the pixel at the lowest position among the pixels constituting the image of the buttocks in the image data falls within the third region.

* * * * *